(12) United States Patent
Biewald et al.

(10) Patent No.: US 9,767,424 B2
(45) Date of Patent: Sep. 19, 2017

(54) ZERO DOWNTIME MAINTENANCE WITH MAXIMUM BUSINESS FUNCTIONALITY

(71) Applicants: Lars-Eric Biewald, Mannheim (DE); Volker Driesen, Heidelberg (DE); Andrey Engelko, Bad Schoenborn (DE); Andre Haferkorn, Heidelberg (DE); Martin Hartig, Speyer (DE); Wieland Hoprich, Mannheim (DE); Heiko Konrad, Hockenheim (DE); Christoph Luettge, Muhltal (DE); Martin Mayer, Heidelberg (DE); Steffen Meissner, Heidelberg (DE); Matthias Mittelstein, Hamburg (DE); Juergen Specht, Gerabronn (DE)

(72) Inventors: Lars-Eric Biewald, Mannheim (DE); Volker Driesen, Heidelberg (DE); Andrey Engelko, Bad Schoenborn (DE); Andre Haferkorn, Heidelberg (DE); Martin Hartig, Speyer (DE); Wieland Hoprich, Mannheim (DE); Heiko Konrad, Hockenheim (DE); Christoph Luettge, Muhltal (DE); Martin Mayer, Heidelberg (DE); Steffen Meissner, Heidelberg (DE); Matthias Mittelstein, Hamburg (DE); Juergen Specht, Gerabronn (DE)

(73) Assignee: SAP SE, Walldorf (DE)

(*) Notice: Subject to any disclaimer, the term of this patent is extended or adjusted under 35 U.S.C. 154(b) by 514 days.

(21) Appl. No.: 14/055,650

(22) Filed: Oct. 16, 2013

(65) Prior Publication Data
US 2015/0106140 A1    Apr. 16, 2015

(51) Int. Cl.
*G06Q 10/00* (2012.01)
*G06Q 10/06* (2012.01)

(52) U.S. Cl.
CPC ................ *G06Q 10/0631* (2013.01)

(58) Field of Classification Search
CPC ........ G06Q 10/00; G06Q 40/00; G06Q 40/06; G06Q 10/0631; G06F 17/60
(Continued)

(56) References Cited

U.S. PATENT DOCUMENTS 6,199,204 B1 * 3/2001 Donohue .................. G06F 8/65
705/59
6,262,207 B1 * 7/2001 Rao ....................... C09D 11/326
523/160

(Continued)

OTHER PUBLICATIONS

Office Action received in U.S. Appl. No. 13/679,561, filed Nov. 16, 2012; 11 pages.

(Continued)

*Primary Examiner* — Romain Jeanty
(74) *Attorney, Agent, or Firm* — Fish & Richardson P.C.

(57) ABSTRACT

The present disclosure describes methods, systems, and computer program products for providing multi-level user interface theming. One computer-implemented method includes instantiating a shadow system and database schema for a new version software application in a shared database, the shadow system database schema containing aliases pointing to tables instantiated in a production database schema, instantiating a bridge database schema containing aliases pointing to each database table within the production database schema, preparing a bridge sub-system connected to the bridge database schema aliases, replicating database tables within the production database schema, for use by the bridge sub-system and adjusting the original database tables for structure and content consistent with the new version software application, deploying an upgrade sub-system and tools to complete adjustment of structure and content of the (Continued)

original database tables, and connecting an instantiated instance of the new version software application to adjusted database tables.

20 Claims, 15 Drawing Sheets

(58) Field of Classification Search
USPC .................................................. 705/7.12
See application file for complete search history.

(56) References Cited

U.S. PATENT DOCUMENTS

| | | | |
|---|---|---|---|
| 6,324,654 B1 | 11/2001 | Wahl et al. | |
| 6,377,959 B1 | 4/2002 | Carlson | |
| 7,055,149 B2 * | 5/2006 | Birkholz | G06F 8/65 705/59 |
| 7,206,752 B2 * | 4/2007 | Kobayashi | G06Q 10/0631 700/95 |
| 7,228,132 B2 | 6/2007 | Gopalakrishnan et al. | |
| 7,454,366 B2 * | 11/2008 | Kato | G06Q 20/202 705/21 |
| 7,565,376 B2 | 7/2009 | Stegmann et al. | |
| 7,624,340 B2 | 11/2009 | Ritter | |
| 7,630,969 B2 | 12/2009 | Ritter | |
| 7,650,609 B2 | 1/2010 | Klevenz et al. | |
| 7,680,783 B2 | 3/2010 | Ritter et al. | |
| 7,689,904 B2 | 3/2010 | Ritter | |
| 7,877,422 B2 | 1/2011 | Kothandaraman | |
| 7,885,847 B2 | 2/2011 | Wodtke et al. | |
| 7,966,566 B2 | 6/2011 | Ritter et al. | |
| 7,979,296 B2 | 7/2011 | Kruse et al. | |
| 7,991,652 B2 * | 8/2011 | Chamberlain | G06Q 10/08 705/26.1 |
| 8,001,079 B2 | 8/2011 | Lu et al. | |
| 8,046,389 B2 | 10/2011 | Ritter | |
| 8,078,505 B2 * | 12/2011 | Veres | G06Q 30/02 705/26.1 |
| 8,099,661 B2 | 1/2012 | Ritter | |
| 8,108,433 B2 | 1/2012 | Baeuerle et al. | |
| 8,140,644 B2 | 3/2012 | Hagale et al. | |
| 8,200,634 B2 | 6/2012 | Driesen et al. | |
| 8,212,683 B2 | 7/2012 | Klein et al. | |
| 8,225,303 B2 | 7/2012 | Wagner et al. | |
| 8,291,038 B2 | 10/2012 | Driesen | |
| 8,356,010 B2 | 1/2013 | Driesen | |
| 8,392,573 B2 | 3/2013 | Lehr et al. | |
| 8,402,086 B2 | 3/2013 | Driesen et al. | |
| 8,412,739 B2 | 4/2013 | Engelko et al. | |
| 8,434,060 B2 | 4/2013 | Driesen et al. | |
| 8,479,187 B2 | 7/2013 | Driesen et al. | |
| 8,484,099 B1 * | 7/2013 | Pope | G06Q 30/0278 705/26.7 |
| 8,589,909 B2 | 11/2013 | Hu et al. | |
| 2003/0130985 A1 | 7/2003 | Driesen et al. | |
| 2005/0027585 A1 | 2/2005 | Wodtke et al. | |
| 2005/0033626 A1 | 2/2005 | Kruse et al. | |
| 2005/0257216 A1 | 11/2005 | Cornell et al. | |
| 2006/0080338 A1 | 4/2006 | Seubert et al. | |
| 2006/0085336 A1 | 4/2006 | Seubert et al. | |
| 2006/0085450 A1 | 4/2006 | Seubert et al. | |
| 2006/0282697 A1 | 12/2006 | Sim-Tang | |
| 2007/0209015 A1 | 9/2007 | Ritter | |
| 2008/0098046 A1 | 4/2008 | Alpern et al. | |
| 2008/0115134 A1 | 5/2008 | Elliott et al. | |
| 2008/0120129 A1 | 5/2008 | Seubert et al. | |
| 2008/0255865 A1 | 10/2008 | Ritter et al. | |
| 2009/0006443 A1 | 1/2009 | Kothandaraman | |
| 2009/0112908 A1 | 4/2009 | Wintel et al. | |
| 2010/0088281 A1 | 4/2010 | Driesen et al. | |
| 2010/0138440 A1 | 6/2010 | Driesen | |
| 2010/0153341 A1 | 6/2010 | Driesen et al. | |
| 2010/0332585 A1 | 12/2010 | Driesen | |
| 2012/0005670 A1 | 1/2012 | Driesen et al. | |
| 2012/0011190 A1 | 1/2012 | Driesen et al. | |
| 2012/0011389 A1 | 1/2012 | Driesen et al. | |
| 2012/0023125 A1 | 1/2012 | Driesen et al. | |
| 2012/0030184 A1 | 2/2012 | Driesen et al. | |
| 2012/0036165 A1 | 2/2012 | Driesen et al. | |
| 2012/0041933 A1 | 2/2012 | Driesen | |
| 2012/0041988 A1 | 2/2012 | Driesen | |
| 2012/0047185 A1 | 2/2012 | Driesen et al. | |
| 2012/0159421 A1 | 6/2012 | Driesen | |
| 2012/0166459 A1 | 6/2012 | Ritter et al. | |
| 2012/0239616 A1 | 9/2012 | Cunningham et al. | |
| 2012/0260242 A1 | 10/2012 | Nguyen et al. | |
| 2012/0303665 A1 | 11/2012 | Engelko et al. | |
| 2012/0304165 A1 | 11/2012 | Bechtel et al. | |
| 2012/0317168 A1 | 12/2012 | Driesen et al. | |
| 2013/0055232 A1 | 2/2013 | Rajan et al. | |
| 2013/0080339 A1 | 3/2013 | Driesen et al. | |
| 2013/0080617 A1 | 3/2013 | Driesen et al. | |
| 2013/0159247 A1 | 6/2013 | Engelko et al. | |
| 2013/0290259 A1 | 10/2013 | Hoprich et al. | |

OTHER PUBLICATIONS

U.S. Appl. No. 12/336,897, filed Dec. 17, 2008, Volker Driesen.
U.S. Appl. No. 12/844,662, filed Jul. 27, 2008, Volker Driesen.
U.S. Appl. No. 12/980,170, filed Dec. 28, 2010, Ritter; Gerd M. et al.
U.S. Appl. No. 12/336,782, filed Dec. 23, 2011, Ritter; Gerd M. et al.
U.S. Appl. No. 13/535,418, filed Jun. 28, 2012, Bettin et al.
U.S. Appl. No. 13/730,746, filed Dec. 28, 2012, Driesen, et al.
U.S. Appl. No. 13/730,753, filed Dec. 28, 2012, Driesen, et al.
U.S. Appl. No. 13/730,756, filed Dec. 28, 2012, Driesen, et al.

* cited by examiner

ZERO DOWNTIME MAINTENANCE WITH MAXIMUM BUSINESS FUNCTIONALITY

BACKGROUND

Upgrading an enterprise resource planning (ERP) system to a new software release often requires upgrading of existing persistent data, for example business object (BO) data, software, customer configurations, application business data, and/or other persistent data associated with a database on the ERP system. The need for upgrading persistent data is common for new software releases often due to changes in a persistency model associated with data instances, for example, changed field value semantics requiring re-assignment of field values and/or new fields or values added to a BO persistency model that must be initialized according to application specific logic. Changes in the persistency model are often due to the need to fulfill new or changed customer requirements, system architectural changes, and/or to react to technology changes. Other reasons to upgrade persistent data include refactoring of the persistency model, software upgrades, and/or changes to a business process model.

Upgrades of persistent data are typically performed during a software upgrade downtime period where the ERP system is taken offline while the upgrade of the persistent data is taking place. Depending on the amount of persistent data to migrate, an upgrade of the persistent data normally requires a considerable amount of time and results in excessive downtime for the ERP system. Excessive downtime impacts an organizations' ability to provide functional business applications and/or necessary data for use by customers. As a result, customers often forego ERP software upgrades and/or establish strict service level agreement (SLA) requirements between the organization and an operational information technology (IT) organization. The SLA normally mandates a maximum permitted downtime for the IT organization to perform persistent data upgrades in order to minimize the impact of persistent data upgrades on ERP systems' business application and/or data usage.

Performing upgrades of persistent data prior to or after the software upgrade downtime period also introduces technical challenges. Upgrading the persistent data after the software upgrade may restrict users to the use of up-to-date/upgraded data that may be limited until the upgrade is complete. Upgrading the persistent data prior to the software upgrade may result in possible conflicts if users change persistent data to be upgraded and often necessitates data locking or multiple re-upgrades of data.

SUMMARY

The present disclosure relates to computer-implemented methods, computer-readable media, and computer systems for providing zero downtime upgrades of persistent data. One computer-implemented method includes instantiating a shadow system for a new version software application and a shadow system database schema in a database shared with a production system executing a first version software application, the shadow system database schema acting as a database connector and containing aliases pointing to tables instantiated in a production database schema associated with the production system, instantiating a bridge database schema in the database, wherein the bridge database schema contains aliases pointing to each database table within the production database schema, preparing a bridge sub-system to execute as a first version software application, the bridge sub-system connected to the aliases contained within the bridge database schema, replicating database tables within the production database schema, wherein the replicated database tables are used by the bridge sub-system and the original database tables are adjusted for structure and content consistent with the new version software application, deploying an upgrade sub-system and tools to complete adjustment of structure and content of the original database tables, thereby created new version database tables, for the new version software application, and instantiating an instance of the new version software application and connecting the new version software application to the new version database tables.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein an alias in the shadow database schema points to a table instantiated in the production database schema containing at least the new version software application.

A second aspect, combinable with any of the previous aspects, wherein each database table within the production database schema is categorized according to the data associated with the database table.

A third aspect, combinable with any of the previous aspects, wherein only particular categorized database tables are replicated for use by the bridge sub-system.

A fourth aspect, combinable with any of the previous aspects, further comprising stopping the first version software application following rolling all end users from the first version software application to the bridge sub-system.

A fifth aspect, combinable with any of the previous aspects, wherein a compensation view is generated for database tables within the production database schema and is associated with an alias within the bridge schema, the compensation view generated for a database table normally accessed using a view.

A sixth aspect, combinable with any of the previous aspects, further comprising shutting down the bridge sub-system, deleting the bridge database schema and associated aliases, and deleting the replicated database tables used by the bridge sub-system.

A seventh aspect, combinable with any of the previous aspects, further comprising generating an alias with an alias name to point to a database table, dropping the alias and renaming the database table to the alias name, and repeating an access attempt to the alias name after a dynamic or pre-determined time interval if an access attempt is made to the alias or database table prior to completion of the dropping step and a database access error is generated.

The subject matter described in this specification can be implemented in particular implementations so as to realize one or more of the following advantages. First, business functions that previously were unavailable (e.g., set to read-only) during a traditional persistent data upgrade "down time" due to database tables being set as read-only will work as usual (e.g., set to read-write) Second, a more fine-grained collision management between productive use and upgrade than locking data on a database table level is performed. As a result, traditional down time is transformed into "bridge time" with limitations (or a restricted operations mode (ROM)) enabling operation of the system in parallel to the upgrade changing the system (i.e., bridge time). Bridge time is minimally disruptive for end users as only selected objects in the system are locked during the bridge time. During bridge time, as few database tables as possible are put into read-only to ease availability of critical scenarios during the bridge period. Productive uses of a system, for example an application executing on an application server, under upgrade during bridge time therefore increases. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
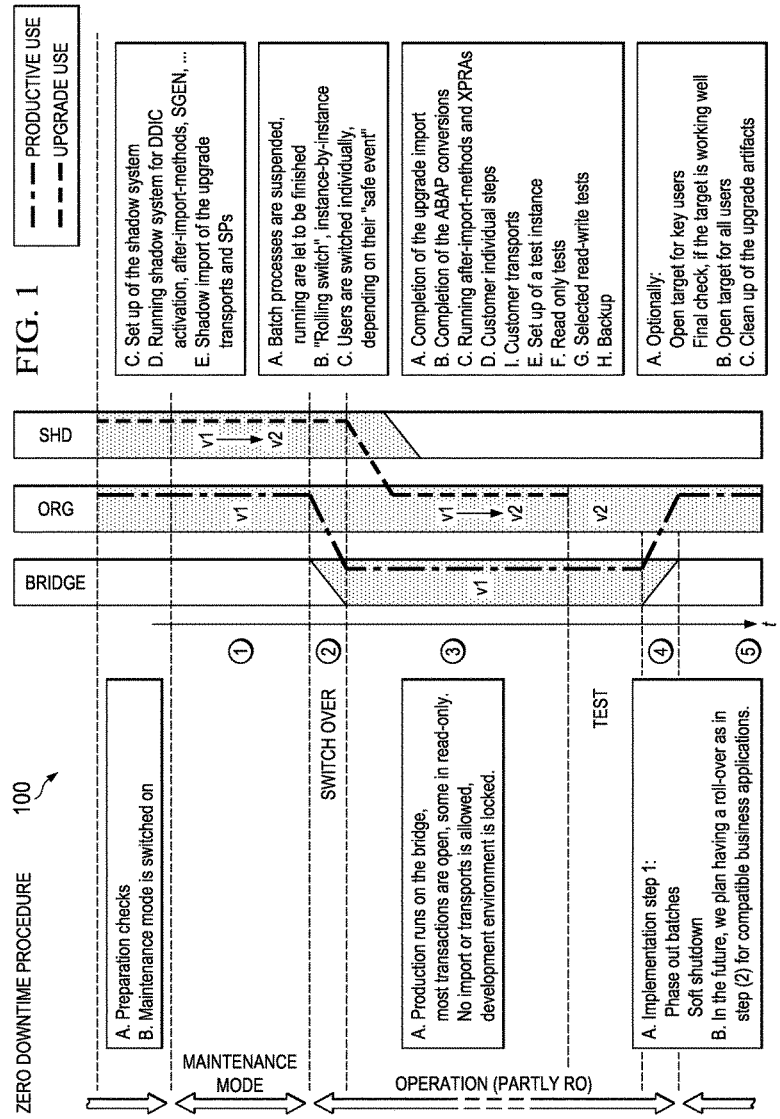
FIG. 1 is a flow diagram illustrating an example method (zero downtime procedure (ZDP)) for a persistent data upgrade according to an implementation.

This disclosure generally describes computer-implemented methods, computer-program products, and systems for providing zero downtime migration of persistent data. The following description is presented to enable any person skilled in the art to make and use the subject matter described in the disclosure, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Upgrading an enterprise resource planning (ERP) system to a new software release often requires upgrading of existing persistent data, for example business object (BO) data, software, customer configurations, application business data, and/or other persistent data associated with a database on the ERP system. The need for upgrading persistent data is common for new software releases often due to changes in a persistency model associated with data instances, for example, changed field value semantics requiring re-assignment of field values and/or new fields or values added to a BO persistency model that must be initialized according to application specific logic. Changes in the persistency model are often due to the need to fulfill new or changed customer requirements, system architectural changes, and/or to react to technology changes. Other reasons to upgrade persistent data include refactoring of the persistency model, software upgrades, and/or changes to a business process model.

Upgrades of persistent data are typically performed during a software upgrade downtime period where the ERP system is taken offline while the upgrade of the persistent data is taking place. Depending on the amount of persistent data to migrate, an upgrade of the persistent data normally requires a considerable amount of time and results in excessive downtime for the ERP system. Excessive downtime impacts an organizations' ability to provide functional business applications and/or necessary data for use by customers. As a result, customers often forego ERP software upgrades and/or establish strict service level agreement (SLA) requirements between the organization and an operational information technology (IT) organization. The SLA normally mandates a maximum permitted downtime for the IT organization to perform persistent data upgrades in order to minimize the impact of persistent data upgrades on ERP systems' business application and/or data usage.

Performing upgrades of persistent data prior to or after the software upgrade downtime period also introduces technical challenges. Upgrading the persistent data after the software upgrade may restrict users to the use of up-to-date/upgraded data that may be limited until the upgrade is complete. Upgrading the persistent data prior to the software upgrade may result in possible conflicts if users change persistent data to be upgraded and often necessitates data locking or multiple re-upgrades of data.

New approaches to improve persistent data upgrades include (discussed in additional detail below):

Transactional & latency free replication respecting import logic.
  Enables parallel productive use and data import while managing collisions.
  All tables which receive an import can be put to read-write. The upgrade functionality will manage the merge of the data.
Persistent row level locking of data accessed by after-import-methods (AIMs) (methods called for certain deployed objects to run an action in the system after the upgrade delta content has been deployed).
  This enables that data which is read by AIMs is locked on a row level and productive use is only limited to not alter the locked data sets. An enqueue server is used to get a lock for data to be changed and standard messages managed by a message server are used by the system to manage write access (i.e., "data set is in use").
Compensation view simulating old structure for tables having already target structure.
  For changes to persistency which are "compatible" and easy to execute with a fast DDL operation (e.g., add null-able field, make field longer), the persistency is not copied and handled with triggers, the production continues to work on the primary tables.
  By this additional disc capacity needed is minimized and workload removed from the system to replicate data.
  Impact on the runtime is minimized, as triggers on heavily used tables can result in performance degradation.
Adjust Upgrade Configuration to Transport Content
  Configure the upgrade and the limitations dynamically, by analyzing the deployed packages.
  This enables restricting the limitations to the absolute minimum necessary for the deployed packages.
Smart switch
  The smart switch enables renaming a table which is used in parallel.
  Using this technique, the procedure can be shortened, as the tables do not need to be copied, they are simply renamed.
Live Clone
  The live clone enables creating a consistent copy of a table in parallel to productive use.
  Puts less tables to read-only but a copy of the table is needed and trigger replication between them.
Sub-System
  The bridge system is defined as a sub-system, as well as the upgrade sub-system. Sub-systems share the enqueue server which ensures, both sub-systems can access shared data in a coordinated manner.
  The sub-system ensures that activities which start in one sub-system are also completed in this sub-system. For example, if batch processes are scheduled, they are executed in the subsystem where they are scheduled.

In some implementations, the following information is included with a software upgrade which results in a need to migrate persistent data and is required at least during the phase where the upgrade tool computes the configuration table content (explained in more detail below):
List of repository+exchange table
  This information is delivered with the upgrade tool: this content defines, which tables belong to category R
Table written by AIM or Application-specific content adaptation program (XPRA)?
  The definition of the AIM and XPRA, which tables are written by AIM is delivered as configuration table content: this information is used to define tables to belong to category T-4 and T-2.
Table read by AIM or XPRA?
  Definition by AIM and XPRA, same approach as above. this information is used to define tables to belong to category T-4 and T-2.
Table in co-use by bridge and upgrade?
  This information is delivered with the upgrade tool: this specified content for category T-1
Tables in co-use by bridge and upgrade—Need for operation on the same keys?
  This information is delivered with the upgrade (e.g., T-1B).

Figure 10:
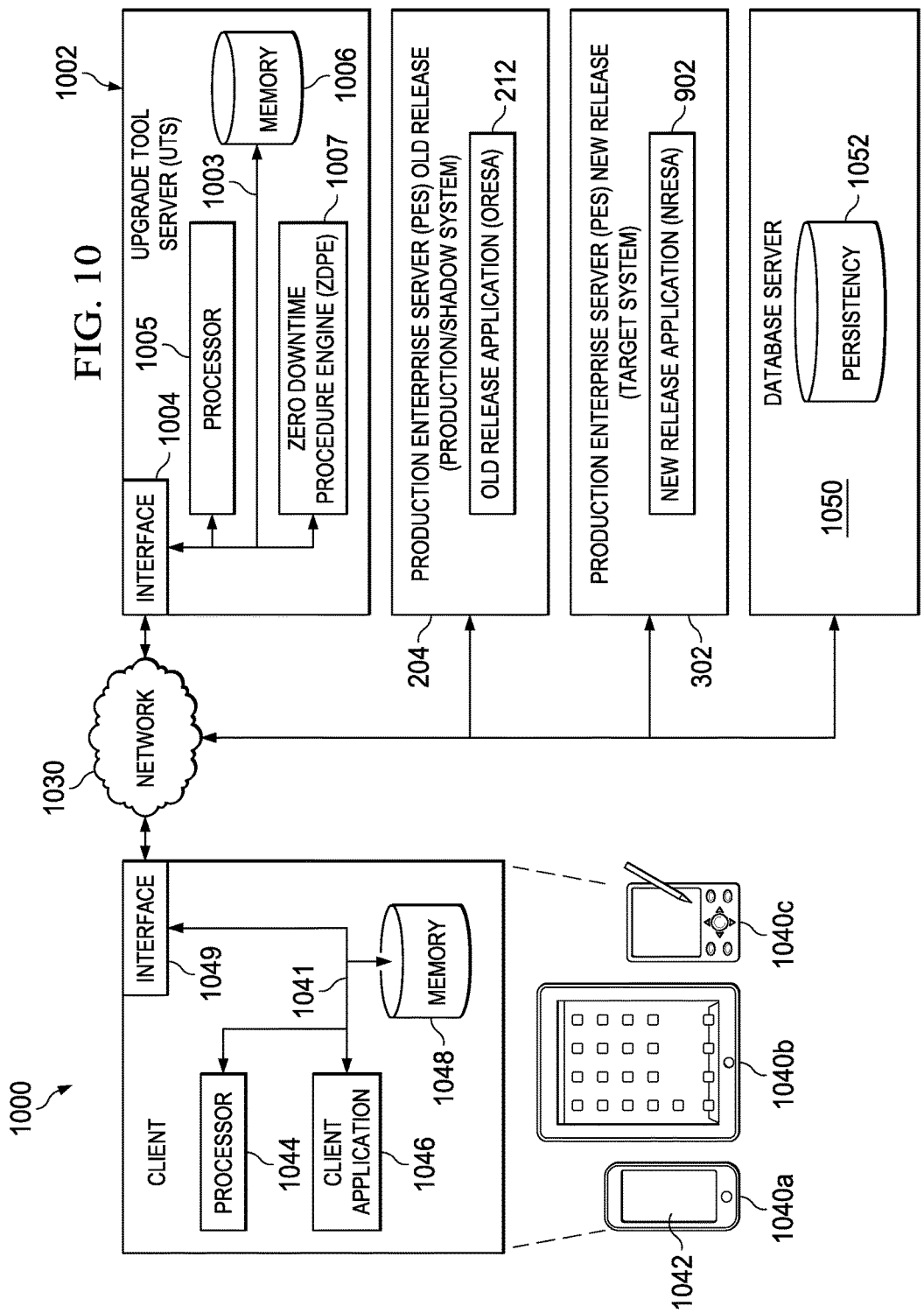
FIG. 10 is a block diagram illustrating an example distributed computing system for performing a persistent data upgrade according to an implementation.

FIG. 1 is a flow diagram illustrating an example method (zero downtime procedure (ZDP)) 100 for a persistent data upgrade according to an implementation. For clarity of presentation, the description that follows generally describes ZDP 100 in the context of the figures following FIG. 1. FIG. 10 represents an exemplary system with which to execute method 100. ZDP 100 may also be performed by any suitable system, environment, software, and hardware, or a combination of systems, environments, software, and hardware as appropriate. In some implementations, various steps of ZDP 100 can be run in parallel, in combination, in loops, or in any order.

The steps of ZDP 100 (additional detail provided with respect to later figures) include the following:
(1) Uptime and shadow system period:
  a. Maintenance mode is switched on.
  b. Set up of the shadow system.
  c. Running shadow system for data dictionary (DDIC) activation, after-import-methods, regenerate software after an upgrade or patch, . . . .
    i. Computing the target structure of all tables in the system and computing a transformation method to come from the current structure to the target version. In addition source code is compiled to executables.
  d. Shadow import of upgrade transports and SPs.
    i. Import of the content of the new release an support packages to the new release (e.g., source code such as classes and function modules, default configuration, translation of text, and the like).
(2) Switch users from production to a "bridge sub system":
  a. Batch processes are suspended, running are allowed to finish.
    i. A "rolling switch" is used on an instance-by-instance basis. The system is composed of "instances". Each instance can server several users. The process is, that a new instance is started to connect to the bridge schema, then one instance after the other of the original system is stopped, users need to logon to an instance of the bridge.
(3a) Bridge operation period:
  a. Production runs on the bridge under maintenance mode, most transactions are open: No import or transports is allowed, development environment is locked.
(3b) Upgrade completion (in parallel to 3a):
  a. Completion of the upgrade import.
  b. Completion of the database table conversion to the new structure.
  c. Customer individual steps, such as executing a backup, performing customer individual configuration changes.

d. Customer transports containing custom own code and delta customizing.
e. Business testing: the customer can logon to the target system and verify the code works as designed.
f. Backup.

(3) Switch users from bridge to target production:
a. Implementation step 1:
  i. Soft shutdown: new user login is disabled. Start of new batch jobs is disabled, then the running batch jobs can finish their task. Users are logged off. Then background processing of queues continues until the queue is empty.
b. Roll-over as in step (2) for compatible business applications.

(4) Target operation:
a. Optionally:
  i. Open target for key users.
  ii. Final check, if the target is working as intended.
b. Open target for all users.
c. Clean up of the upgrade artifacts.

instance 212. The database tables 216 are divided into categories for purposes of persistent data upgrading as the different categories are handled differently by the ZDP 100 and associated components (e.g., a shadow system explained below). For example, database tables 216 can be divided into categories R, T-1a, T-1b, T-2, T-2, T-3, and T-4 based upon data contained within and/or the use of the database table. For example, in some implementations, table categories can correspond to the following:

T-1 (a/b): Application business data.
T-2: Batch management, user management, customer customization
T-3: Business customization, individualization, default customization
T-4, R: Software code, reports, classes, user interface add-ons, table migration, complex structure conversion.

In some implementations, the following table, Table 1 provides an overview, which table categories are supported, how they map to the handling in the ZDP 100 and how they are accessed from a sub-system bridge (production system) or target system (upgrade).

TABLE 1

| Category | Sub-category | Copy Table | Comp. view | Trigger | Access by Bridge | Access by Upg | Members |
|---|---|---|---|---|---|---|---|
| T-1 | T-1a | | | | RW | No | Application tables |
| | T-1ac | | X | | RW | No | Application tables with comp. view |
| | T-1b | | | | RW | RW | Ops. tables |
| | T-1bc | | X | | RW | RW | Ops. tables with comp. view |
| T-2 | T-2 | | | | RO-rows | RO | Read by AIM |
| | T-2c | | X | | RO-rows | RO | Read by AIM |
| T-3 | T-3 | X | | X | RW | RW | Deployment of content of the new release. Code, default customizing, texts |
| T-4 | T-4 | X | | | RO | RW | Exceptions |
| | T-4r | X | | | RO | RW | Repository |

Figure 2:
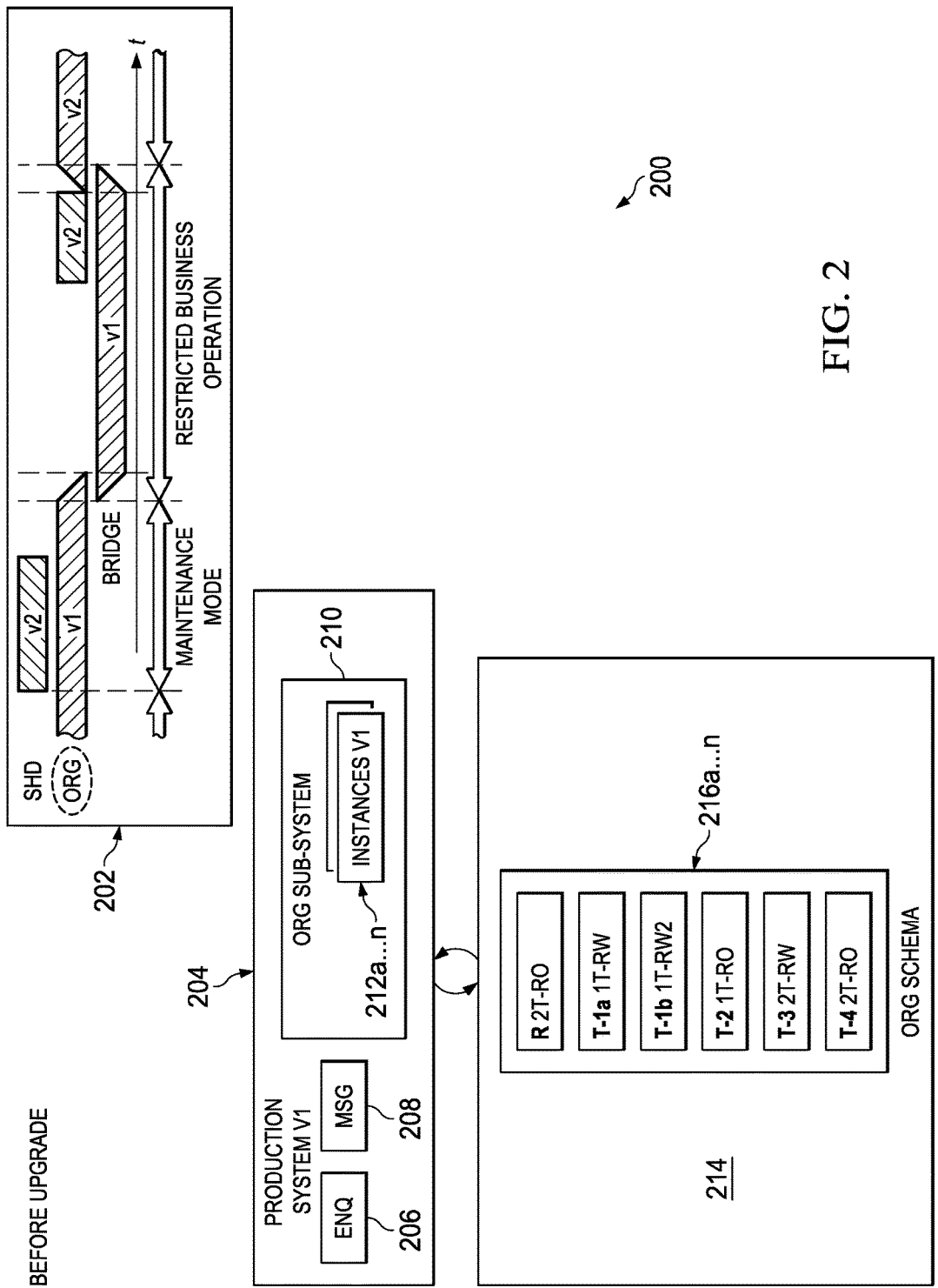
FIG. 2 is a block diagram illustrating an example system prior to a persistent data upgrade according to an implementation.

FIG. 2 is a block diagram illustrating an example distributed computing system (EDCS) 200 prior to a persistent data upgrade using the ZDP 100 of FIG. 1. Note that a small process legend 202 (sideways oriented) is presented in the upper right corner of FIG. 2 and later figures to indicate a process location with respect to the ZDP 100.

Production enterprise server old release (production system) 204 comprises an enqueue (enq) server 206, message (msg) server 208, org ("production") sub-system (old release application servers) 210 and one or more instances V1 (old release application (ORESA) instances) 212a . . . n (also refer to FIG. X). An ORESA instance 212 is selected for a user connecting to the old release application servers 210 based on load balancing or the equivalent.

The enq server 206 provides a mechanism for system components to gain an exclusive lock on a data record in a persistency (described below). The msg server 208 provides standard messaging between system components. The msg server 208 also communicates changes to persistency data related to a particular ORESA instance 212 in order for the particular ORESA instance 212 to update its associated data for consistency with other ORESA instances 212.

EDCS 200 also includes a persistency (not illustrated) containing an original schema (org schema) 214 with one or more database tables 216a . . . n used by each ORESA In some implementations, more or less categories are envisioned depending upon the particular needs of a version of an ORESA instance 212 (or application upgrade target version). With respect to Table 1, the meaning of particular designations are explained below:

a. 2T means two tables are used in the procedure, an original and a clone.
b. 1T means, one table is used, both by the upgrade and production.
c. RO means, the table is read-only for the bridge
d. RW means, the table is read-write for the bridge.
e. 2T-RO is an abbreviation of "two tables, read-only for the bridge"

In some implementations, the decision tree to assign a database table to a category is:
1. Is the table a "repository+exchange" table?
Yes→T-4r (or "R")
2. Does the table receive import by deployment?
Yes→
Table read or written by AIM or XPRA?
  Yes→T-4
  No→T-3
3. Is table written by AIM or XPRA?
Yes→T-4
4. Is table read by XPRA?

Yes→T-4
5. Is table read by AIM?
Yes→
Table structure change?
  Yes→
    "compensation-view compliant"?
      Yes→T-2c (with shared enq)
      No→T-4
  No→T-2 (with shared enq)
6. Is table in co-use by bridge and upgrade?
Yes→
Need for operation on the same keys?
  Yes→(thus we need enq)
  Table structure change
    Yes→
      "compensation-view compliant"?
        Yes→T-2c
        No→T-4, this is a conflict, since we want the table to be written, this gives an error message
    No→T-3
7. Is table structure changed?
Yes→
"compensation-view compliant"?
  Yes→T-1ac
  No→T-4
8. All no→T-1a

In some implementations, the conditions considered to assign a database table to a category using the prior-described decision tree are:
1. Is the table a "repository+exchange table"?
This information is delivered directly as configuration table content
2. Does the table receive import by deployment?
Analysis of all transports part of the upgrade.
The analysis prints a list of tables receiving import by the transport
3. Is the table written by AIM or XPRA?
Definition by the AIM and XPRA, which tables are written. This is delivered.
Analyze all transport orders, which kind of transport object types are used.
Analyze the transport object types, which AIM is used and which XPRAs are started.
Compute, which tables are written.
4. Is table read by AIM or XPRA?
Definition by AIM and XPRA. This is delivered.
Same approach as above.
5. Is table in co-use by bridge and upgrade?
This information needs to be delivered with the upgrade.
6. Is tables in co-use by bridge and upgrade—Need for operation on the same keys?
This information needs to be delivered with the upgrade.
7. Is table structure changed?
Result of the dictionary program ("distributor") computing the table adjustment statements.
8. Is table structure changed—is change "compensation-view compliant"?
Additional check after "distributor" if only a new field is added.

Prior to the persistent data upgrade, production system 204 connects to the org schema 214. The upgrade configuration is executed including extracting the configuration delivered with the upgrade program and the configuration that is part of the deployment packages. Additionally, analysis is performed on the extracted configurations to dynamically minimize, as much as possible, the impact of the persistent data upgrade on end users. The upgrade content is analyzed, to identify, to which tables content is deployed. Only those tables are cloned in this specific run of the upgrade. In this way, the tool automatically adjusts to the deployed content. The less content, the less tables are cloned.

Figure 3:
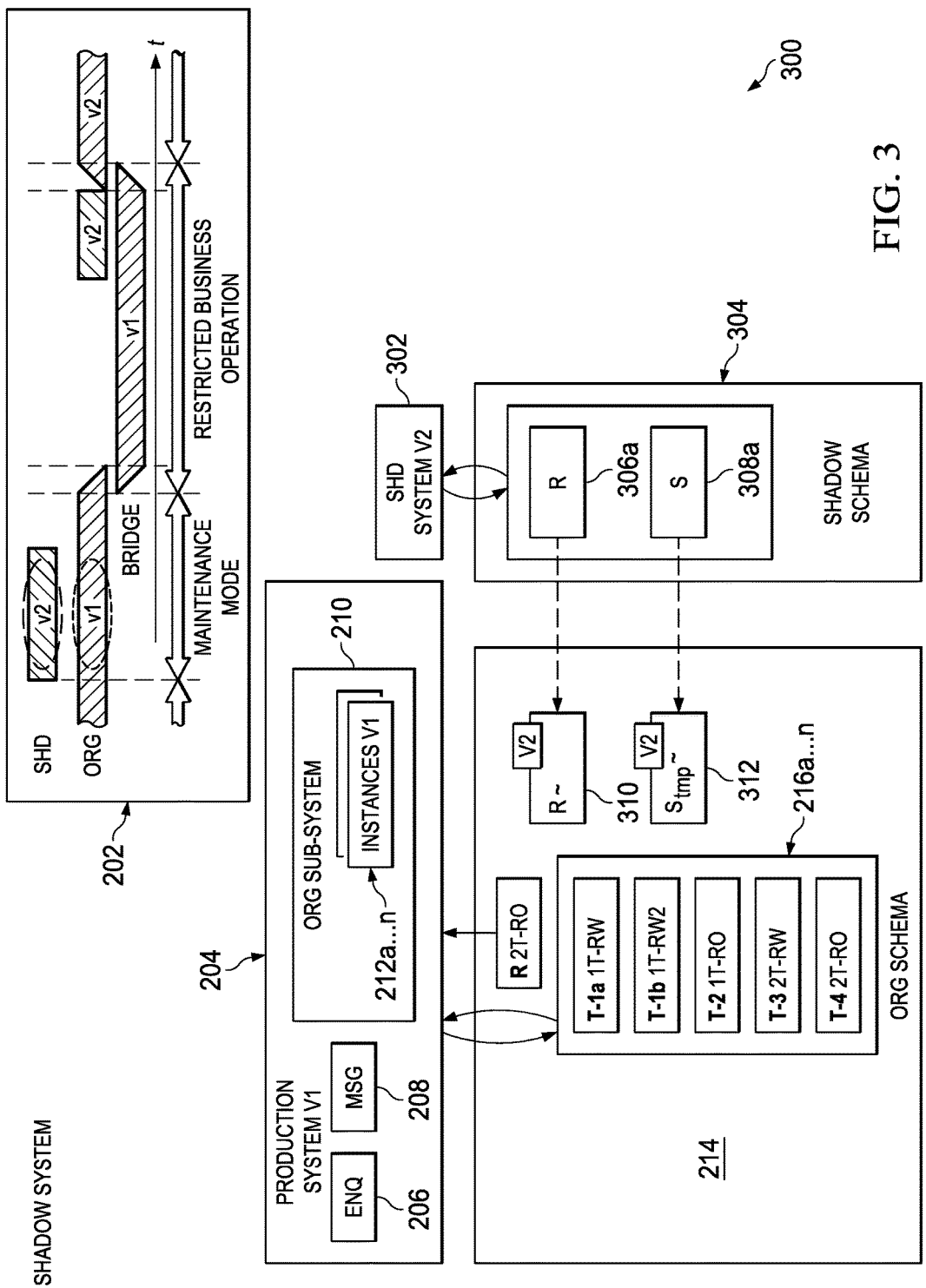
FIG. 3 is a block diagram illustrating a generated a shadow system for use by the ZDP according to an implementation.

FIG. 3 is a block diagram 300 illustrating a generated a shadow system for use by the ZDP 100 according to an implementation. During the uptime and shadow system period (step 1 of FIG. 1), persistent data upgrade preparation checks, such as checking if there is enough free space in the DB to not run out-of memory during import of the new content, are performed, a maintenance mode indicator is switched on for the production system 204 and persistency 214, and a shadow system 302 is set up. The maintenance mode indicator sets the change management of the system to "read-only" for Code and data dictionary definition. In this way, the development environment in the system is locked and no more development can take place.

As illustrated, a separate production enterprise server new release (target system)) or "shadow system" 302 and a separate shadow schema 304 is instantiated. "Maintenance mode" ensures that a set of tables classified as the repository (in the diagram annotated with "R "2T-RO" in org schema 214) is set to read-only as indicted by the single arrow between the repository and the production system 204 to prevent modification of the original production system 204 version code. For the end-user this means, no development and no configuration change to data within the associated tables can be performed. Business operation is to this point unaffected. Note that the remaining tables org schema 214 are still set to read-write as indicated by the double arrow between the database tables 216 and the production system 204. The shadow system 302 is used to create a target version of the repository tables with an "R" classification holding, for example, the target version of the code, programs, UI and configuration. Here, the shadow system is operating the target NRESA software, but it is only a temporary use and it is removed after use—only the data stored in the shadow tables is kept.

Also, in step 1 of the ZDP 100, the upgrade configuration is finalized. For example, in this step, data structure change statements are computed, which database tables will receive a compensation view is derived, which tables will receive a database trigger is derived, which tables will be cloned is derived, and which tables will be "smart switched" is derived. This information is transmitted to the configuration of a zero downtime procedure (ZDP) engine (refer to FIG. 10).

All target system software is deployed to a new database table within the org schema 214, here indicated as "R~" 310, and operational data is written to table S_tmp~ 312 (or an equivalent table/data structure). Table S_tmp~ 312 can contain information about batch jobs run by the upgrade in the shadow system, logon information of the technical user used by the upgrade to run the batch jobs. This data is dropped after the shadow system is deleted. Within the shadow schema 302, aliases 306a and 308a are created to refer to tables R~ 310 and S_tmp~ 312, respectively. In this way, shadow system 302 is configured to point to the new shadow schema 304 but is allowed to access data within org schema 214, for example the target system software in R~ 310.

Figure 4:
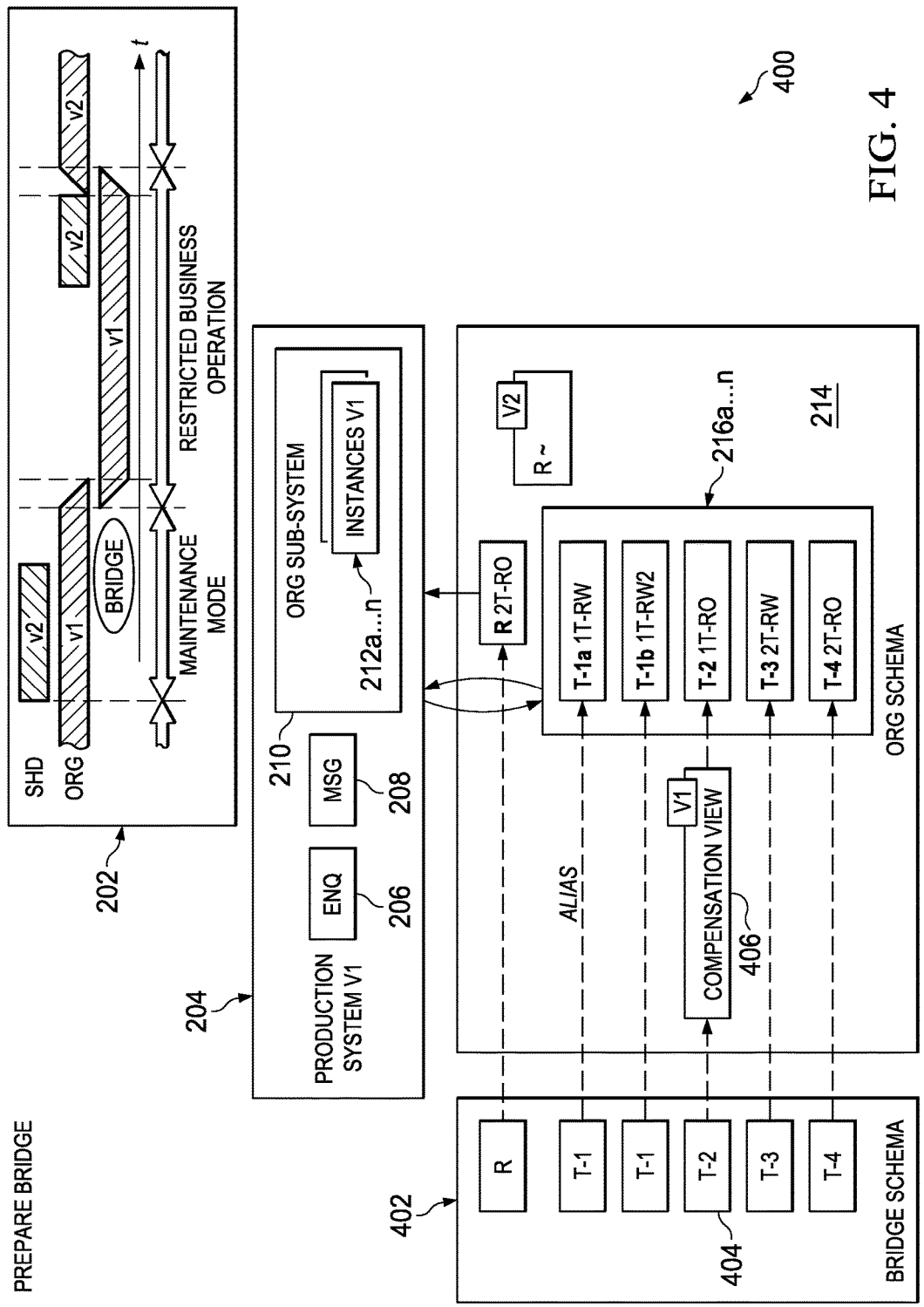
FIG. 4 is a block diagram illustrating a generated bridge schema for use by the ZDP according to an implementation.

FIG. 4 is a block diagram 400 illustrating a generated bridge schema 402 for use by the ZDP 100 according to an implementation. A "bridge" system (illustrated in FIG. 5) is created prior to entering step 2 of the ZDP 100. The bridge system is not a separated system as the previously-described shadow system, but a "sub-system" that is part of the production system 204 and shares the enq server 206 and msg server 208 with the production system 204. A sub-system is defined as a group of dialog instances which are "closed" in the sense, that all asynchronous processing and load balancing is done within the dialog instances which are part of the sub-system only. This ensures that all production transactions and processes originated in the sub-system complete in the subsystem. The sub-system can have a separate database connection and can be used to run different software versions represented by different repository tables.

The bridge system is set up as a set of instances sharing a common database connect to another schema (the bridge schema 402) other than the org schema 214. In some implementations, in creating the bridge system:

A new bridge schema 402 is created in the persistency or an empty existing schema is re-used.

A set of compensation views is created in the org schema 214 for the categories: T-1a/c, T-1b/c, T-2c (not all categories illustrated or discussed in detail). If there are usually views used with a database table, views (or "compensation views") are created in the bridge schema 402 as part of a database alias to provide similar views for database table access. The compensation view is given name that is different than the table in the categories. For example, the compensation view has a trailing special character as "~." Compensation views are useful because some tables are changed by a persistent data upgrade only by adding a new field or extending a field. These operations can be performed by the database very fast so it would be a significant overhead to create a copy of the table and establish triggers to replicate changes to the copied table. For example, the following approach can be used:

The bridge sub-system 502 is set up using a compensation view which selects all fields of a related database table (production system 204 version). The compensation view is, for example, a "select f1, f2, . . . fn from tab".

The database table is extended, while the view is not: if the database table gets fields fx, fy, the view still is only "select f1, f2, . . . fn from tab". The new fields are not selected.

If there is a read though the view, the additional fields do not show up.

If there is a write though the view, the additional fields get the default value.

The advantage is that additional overhead is not created in the procedure, the procedure executes for quickly and there is less additional DB space used and performance is not impacted.

Within the bridge schema 402, aliases are created which point to all the tables in the production system 204 (including any compensation views). Where compensation views are used, the aliases have a name identical to the name of the table, the compensation view is pointing to. As illustrated in FIG. 4, database alias T-2 404 points to a compensation view 406 which points to org schema 214 database table T-2 216. Note that in the example presented by FIG. 4, a single compensation view is shown for database alias T-2 404. In actuality, there may be multiple other compensation views for other database alias/database table pairs.

If the system has views in addition to tables or other DB artifacts as stored procedures, these are created in the bridge schema as well.

Figure 5:
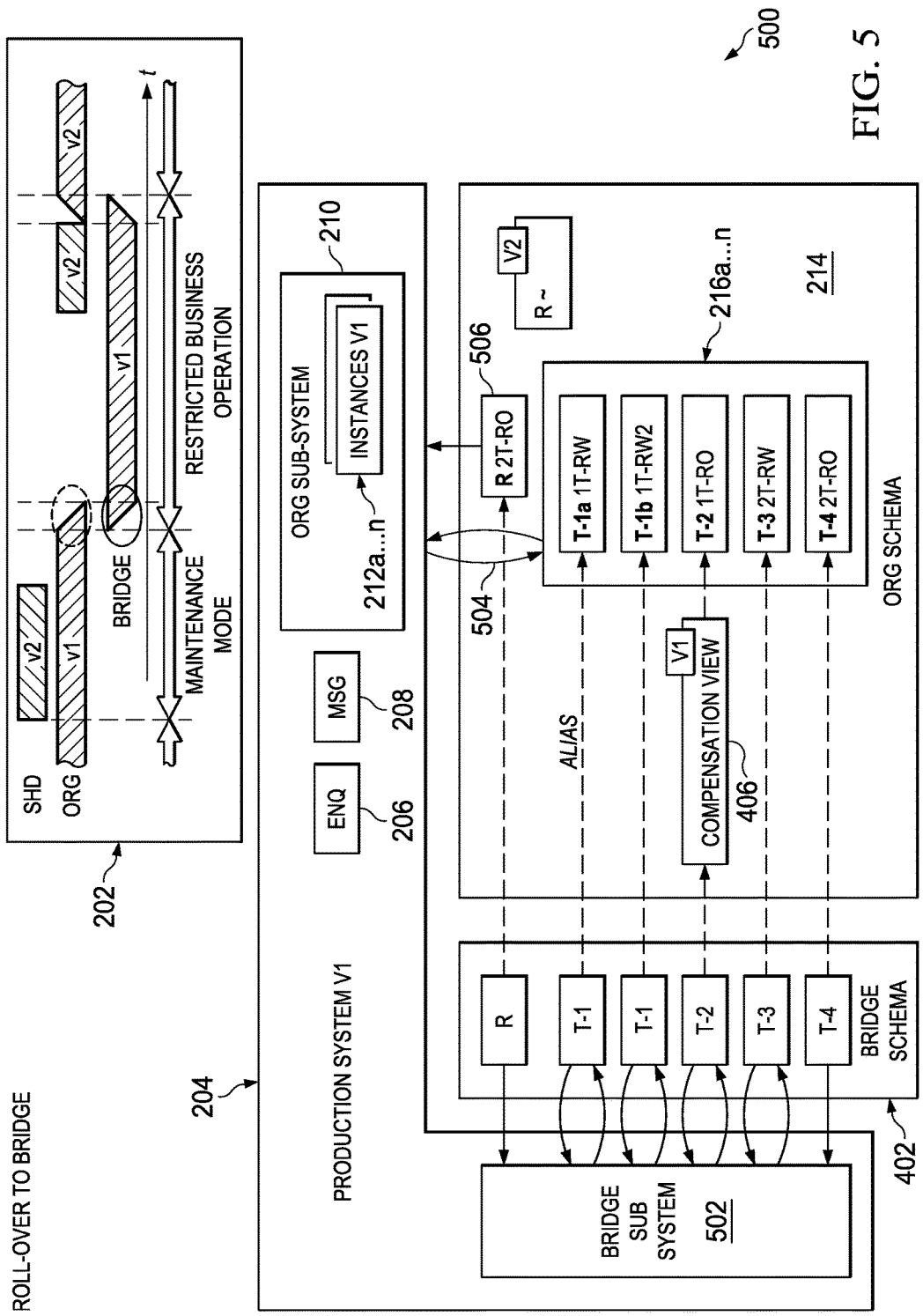
FIG. 5 is a block diagram illustrating a roll-over to a system bridge according to an implementation.

FIG. 5 is a block diagram 500 illustrating a roll-over to a system bridge sub-system 502 according to an implementation as detailed by step 2 of FIG. 1. The bridge subsystem 502 is started using the bridge schema 402 as a database connector. The bridge sub-system reads and writes through the aliases created in the bridge schema 402 to the original tables 216 associated with the org schema 214. In this configuration, the original tables 216 are used commonly by the production system 204 and the bridge subsystem 502. The enq server 206 is shared between the two sub-systems to manage locks for read-write of database tables 216 in order to prevent uncontrolled parallel data usage and conflicts.

Note that read-write configuration with respect to particular database table 216 table categories is preserved by the system bridge 502. For example, repository 506 is still read-only as previously set for the persistent data migration. Other database table 216 table categories are set to either read-write access (e.g., T-1a/b, T-2, T-3) or to read-only (e.g., T-4).

End users are also migrated from using the production system 204 database connector 504 to the database tables 216 to using the bridge system 502 to access the database tables 216. In some implementations, migration to using the bridge system 502 includes suspending batch processes and allowing running processes to complete, using a "rolling switch" on an instance-by-instance basis. The SAP system has several "instances" of the application server at runtime to enable scale-out. Each instance typically runs on its own host or virtual machine and each instance is capable of serving several user requests. Users are switched individually, depending when they log-off from the old instance and logon to the new. Once the migration is complete, the database connection 504 between the production system 204 and the database tables 216 is severed (refer to FIG. 6 for an illustration of this state).

Following the roll-over to the system bridge sub-system 502, the production system operates in a bridge operation period and perform the persistent data upgrade as detailed by steps 3 a/b of FIG. 1. FIGS. 6A-6C and 7-8 describe elements of the persistent data upgrade process following the roll-over to the system bridge sub-system 502. The operation in the bridge system can be limited with respect to write access to some tables. Tables which fall in the exception category T-4 are read-only, which will disable some change operations in the system.

Figure 6A:
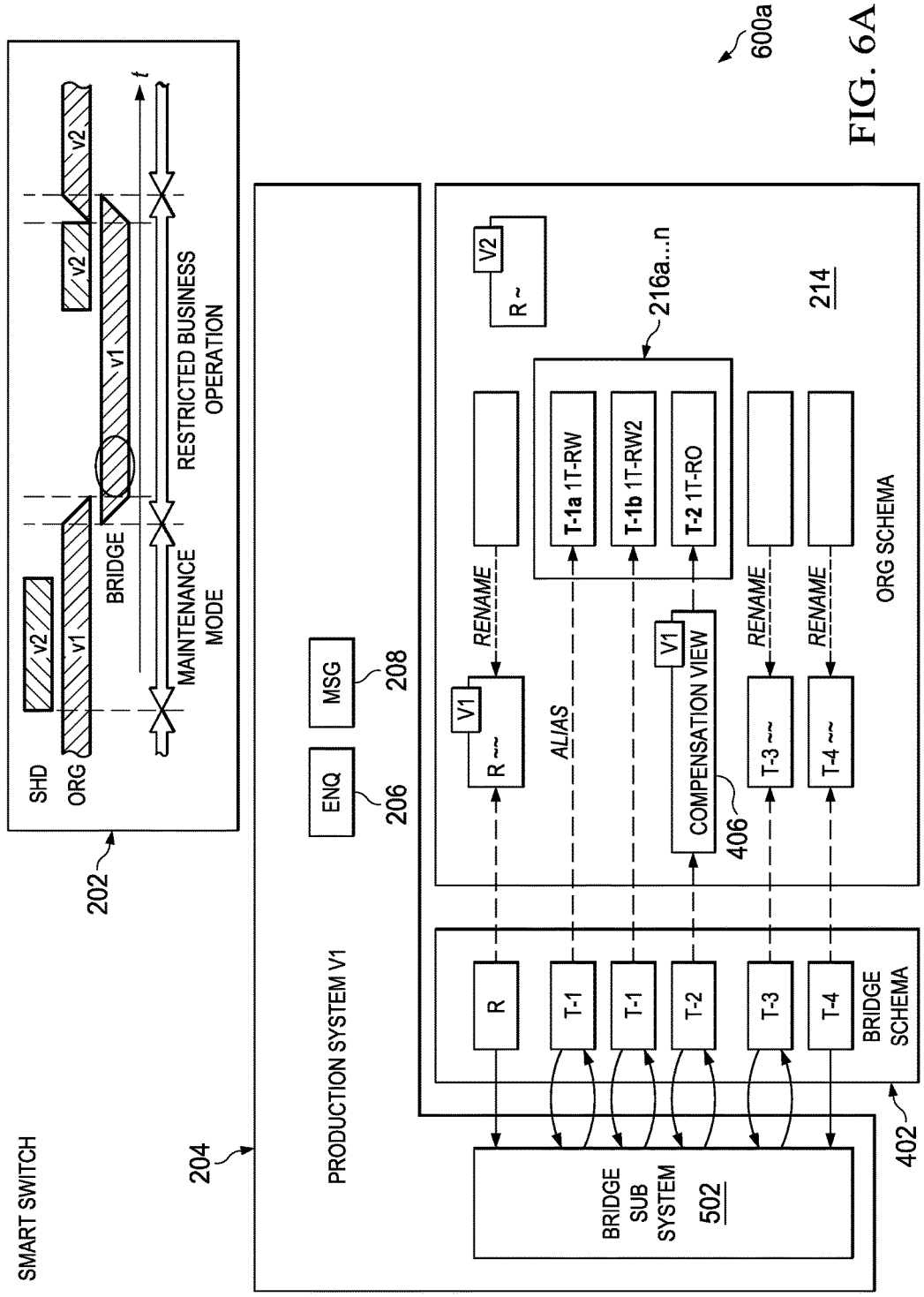
FIG. 6A is a block diagram illustrating using a smart switch to copy production version database tables according to an implementation.

FIG. 6A is a block diagram 600a illustrating using a smart switch to copy production version database tables according to an implementation as detailed by step 3 b of FIG. 1. Once all users are logged on to the bridge sub-system 502, the old release application servers 210 and associated ORESA instances 212 are stopped and the bridge system 502 replaces these components, and the ZDP 100 continues where a pair of tables is created for each table of category "T-3, T-4 (including R)" where the bridge sub-system 502 accesses the copy table T~~ (or other designation) which remains with the production system 204 older structure and content and a table T (or other designation) which is adjusted to the new structure and content. For the category T-3, data written to the T~~ by the bridge subsystem is replicated to the target table.

In some implementations, the table creation is performed in the following manner:

Tables T-3, T-4 (including R) are moved to T~~ using the "smart switch." (refer to FIG. 6B below)

Tables T-3 are "live cloned."

This step establishes the target structure of the table for T.

Tables T-4 can either be copied using liveClone as well, or—as there are no write updates—using a standard table cloning.

This step establishes the target structure of the table for T.

Figure 6B:
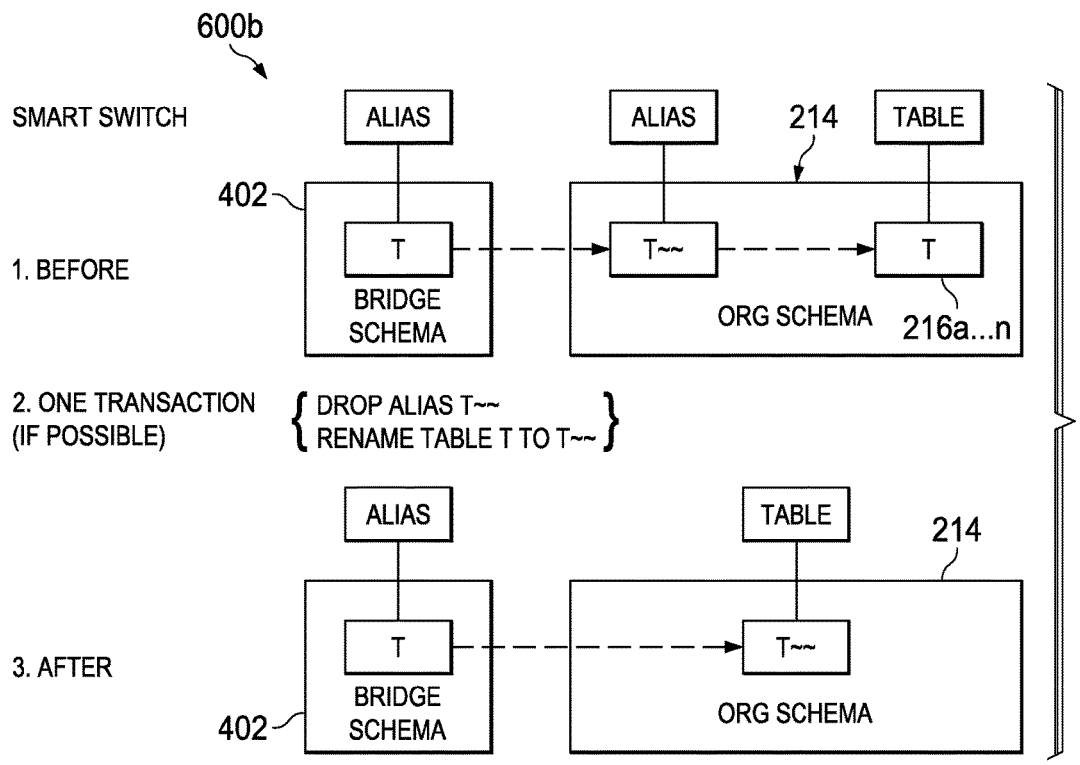
FIG. 6B is a block diagram providing details of a smart switch operation according to an implementation.

Turning now to FIG. 6B, FIG. 6B is a block diagram 600*b* providing details of a smart switch operation according to an implementation. In performing a smart switch operation:

A database alias is created pointing to the org schema 214 database table 216. For example, database alias T~~ pointing to table T.

A database alias is created pointing from the bridge schema 402 to the above-created database alias T~~.

The switch is done (in one transaction if possible):
Drop database alias T~~

Rename the database table 216 that database alias T~~ points to to be the same name as the dropped database alias T~~.

The database alias T now points to the renamed database table T~~.

During the smart switch operation, the production system 204 continues to run using the database alias T. To be able to rename the table, the database will require an exclusive lock. The write operation on the database alias is be synchronized with the rename. Note that the read operation might break if the table is renamed. In the database access layer, a re-do or a broken read to non-existing tables is executed in the chance that this happens during the smart switch to correct the issue.

Figure 6C:
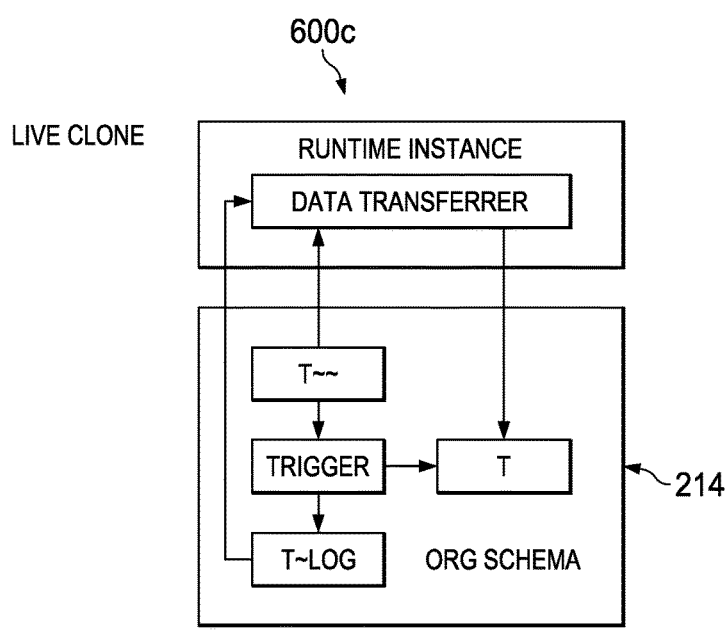
FIG. 6C is a block diagram illustrating a live clone operation according to an implementation.

Turning now to FIG. 6C, FIG. 6C is a block diagram 600*c* illustrating a live clone operation according to an implementation. A live clone ensures a copy of a table can be created and that the copied content is consistent even if the original table is used productively in parallel (e.g., inserts, updates, deletes, open transactions and rollbacks, select for updates and other locks can be used). In some implementations, the live clone procedure includes:

1. The original table is T~~ (structure is version 1)
2. Create a copy table with the structure of version 2: named T
3. Create a log table T~log
4. Create a trigger on T~~:
   a. If replication to T is switched on: The trigger updates in the same transaction as T~~ the table T
   b. If replication to T~log is switched on: The trigger updates in the same transaction as T~~ and the table T~log
5. The trigger is switched on to "replicate to T~log"
   a. By this, all subsequent updates to T~~ write an entry to T~log
6. The data transferrer is started to copy all entries from T~~ to T while adjusting the structure of version 1 to version 2.
   a. This is to a certain extent a "dirty copy" if the database provides only "dirty read".
7. The trigger is switched to "replicate to T"
   a. By this, all subsequent changes to T~~ are written as well to T
8. The trigger is switched to stop replication to T~log
9. The data transferrer reads table T~log.
   a. The transferrer reads a key from T~log.
   b. It submits a "select for update" on T~~ for the key with "no wait". If the transferrer can get the lock, it copies the key. If not, it continues and tries again later.
   c. It iterates these steps until T~log is empty At this point the table T has all content of T~~ and further changes to T~~ are written with the same transaction. There is no latency and it is transactionally consistent.

Figure 7:
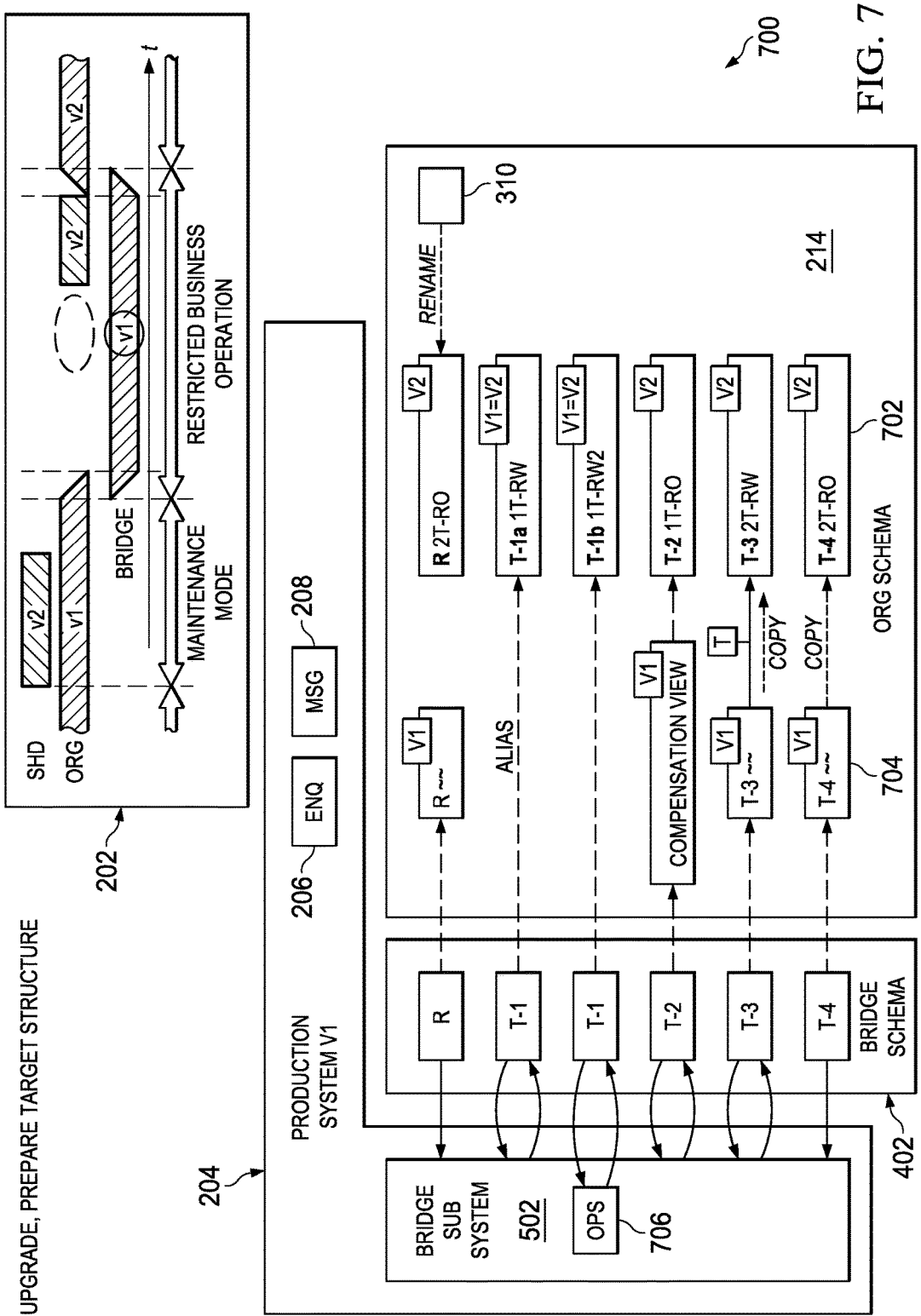
FIG. 7 is a block diagram illustrating a deployment of an upgrade sub-system and tools according to an implementation.

FIG. 7 is a block diagram 700 illustrating a deployment of an upgrade sub-system (which becomes the final NRESA system) and tools according to an implementation. The ZDP 100 continues to adjust the structures of the target system 302 for all tables, which have a "compensation view. In this step, the shadow repository R~ is switched: R~ 310 is renamed to R. R now points to the target system 302 software, etc. At completion, all database tables 702 associated with the target system 302 have the target version structures or are interchangeable with the production system 204. Note that the production system database tables 704 (including T-1*a* and T-1*b*) are still in use by the production system 204. The system contains operations system services (OPS) 706 such as a batch management system (scheduling, monitoring and logging batch processes), user management (storing login timestamps, number of failed login, access permission), number range management (guaranteed unique numbers for e.g. billing), and the like.

Figure 8:
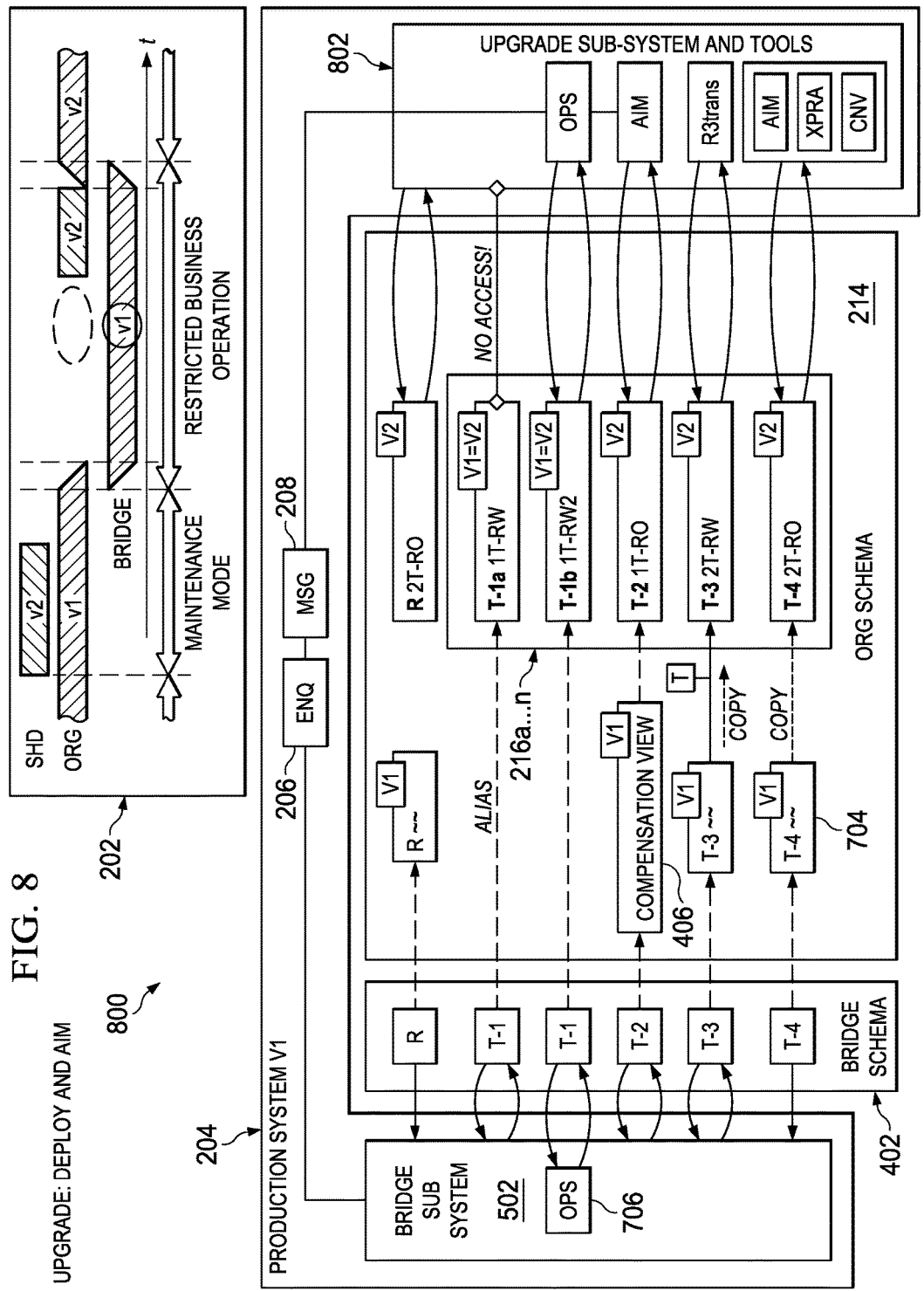
FIG. 8 is a block diagram illustrating deployment of an upgrade sub-system and tools according to an implementation.

FIG. 8 is a block diagram 800 illustrating deployment of an upgrade sub-system and tools 802 according to an implementation. The ZDP 100 continues to adjust the database table content to the target system 302 version. In some implementations, this is performed in three steps:

1. The table content is deployed. Deployment is done to tables of category T-3. The deployment is done to table T, the production uses in parallel table T~~ and a trigger replicates the data written by the production from T~~ to T. In some implementations, the deploy program writes all keys to an "import-key-directory" or other directory which contains the table name and the keys which are imported. The trigger updating the target table in addition to the productively used table, looks in the "import-key-directory", before doing the import to the target and skips the import, if they keys match.

2. After-import-methods (AIM) are run. AIMs read data from the table after receiving a persisted lock in order to have the bridge not access this data with write operations. The idea is to let the AIMs specify the data sets they want to read by requesting a persisted lock—only for the sets which are read, not for all involved tables and all keys. Expecting that there are only a few collisions between the upgrade and the productive use, this would impact the production operation only minimally. In fact, this would limit the impact of the upgrade to the possible minimum. Further reduction can only be achieved by separating content further (table or row level). One example of an AIM is "Business Configuration Set Deployment", these are default configurations shipped as a package, which is only extracted, if a customer has switched on that the configuration should be used. Otherwise, it is not extracted. This is an example of a method running after the deployment of the customizations reacting on settings by the customer in the system. The AIM thus reads data managed using category T-2 and T-3 and changes data in the system of category T-2.

3. XPRAs are run. These read and write only T-4 data. These are application specific programs that migrate a persistency to a new structure (e.g., if a persistency is re-designed to now use now three instead of formerly two tables, the XPRA reads from the old two tables and writes to the new three tables). In some implementations, XPRAs cannot perform these operations in a trigger as they are run in the system software, therefore the two tables read by the XPRA are set to read-only so any changes to the tables are not reacted on.

Note at this step, the upgrade sub-system and tools 802 have access to database tables 702 associated with the target system 302 with the exception of category T-1a database tables.

Figure 9:
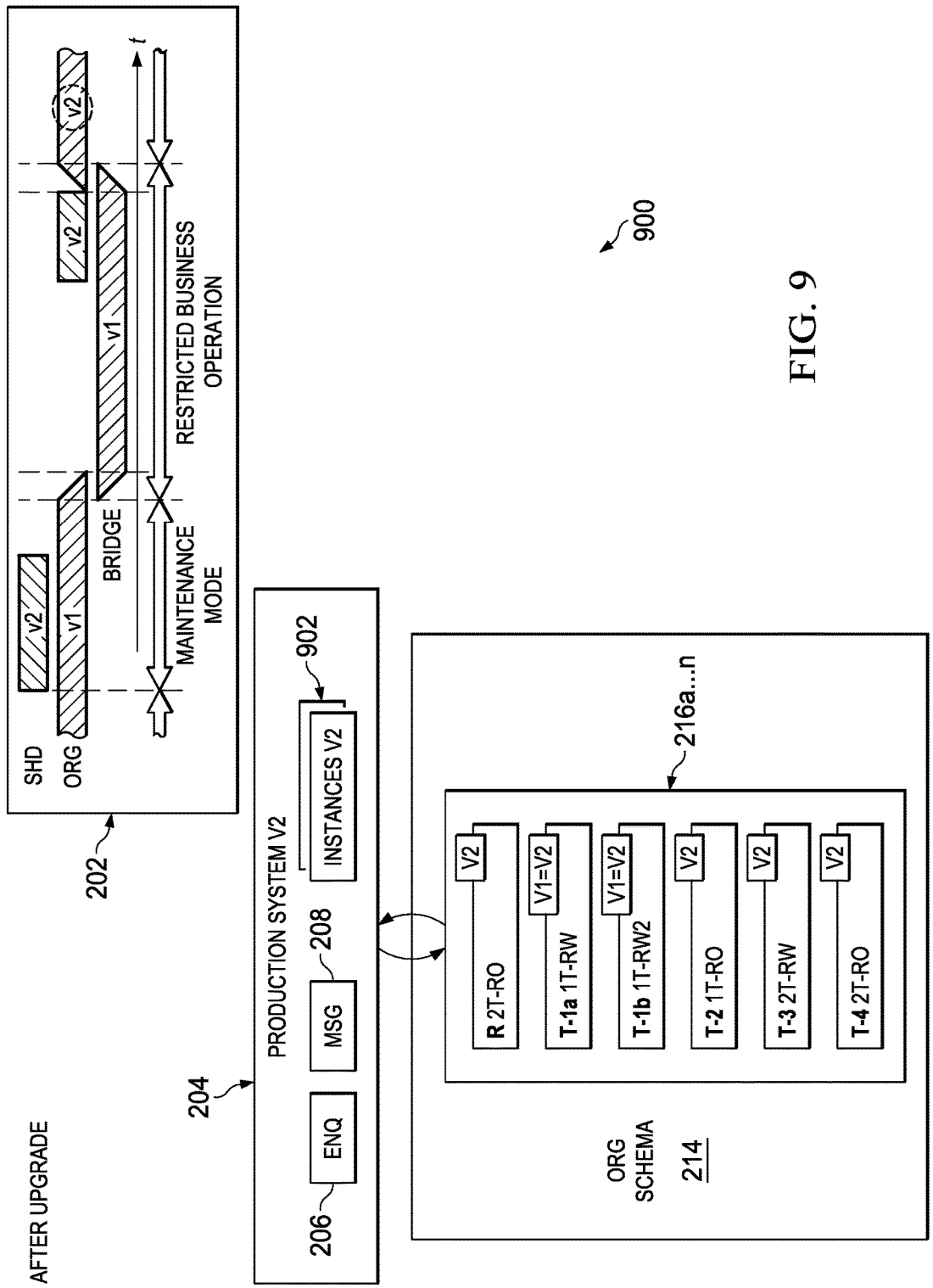
FIG. 9 is a block diagram illustrating the production system after the persistent data upgrade is complete according to an implementation.

FIG. 9 is a block diagram 900 illustrating the production system after the persistent data upgrade is complete according to an implementation. The target system 302 performs a smart shutdown of the bridge sub-system 502 (executing production system 204 software) and a synchronous re-logon of all end users to the target system 302 which has now become the production system 204. Org schema 214 now contains database tables 216 configured for use by the target system 302 software (new release application (NRESA) 902 instances). At this point, the database aliases in the bridge schema and the old T~~ tables can be removed to finalize the upgrade.

FIG. 10 is a block diagram illustrating an example distributed computing system (EDCS) 1000 for performing a persistent data upgrade according to an implementation. At a high level, the illustrated EDCS 1000 includes or is communicably coupled with a upgrade tool server (UTS) 1002, a production enterprise server old release (PESO) (production/shadow system) 204, a PES new release (PESN) (target system) 302, a database server 1050, and a client 1040 that may communicate using, for example, a network 1030 or other communication method. In some implementations, the UTS 1002, PESO 204, PESN 302, and/or database server 1050 can be limited as to which other component of the distributed computing system 1000 communication is permitted. The UTS 1002, PESO 204, PESN 302, and/or database server 1050 may each comprise a computer operable to receive, transmit, process, store, or manage data and information associated with the EDCS 1000 or be implemented on a single computer or multiple computers in various combinations.

The UTS 1002 is an enterprise server executing at least a zero downtime procedure engine (ZDPE) 1007. At a high-level, the UTS 1002 is responsible for upgrading/migrating ORESA 212 persistent data present in tables on the database server 1050 into a NRESA 902 compliant format. Requests to persistent data are typically part of a normal software upgrade process, for example, an overall software upgrade process when upgrading from the ORESA 212 to the NRESA 902. In some implementations, requests to migrate data can also be received from the client 1040, internal users, external or third-party customers, other automated applications, as well as any other appropriate entities, individuals, systems, or computers. The UTS 1002 responds to the received requests by processing the data migration requests in the ZDPE 1007. The ZDPE upgrades persistent data consistent with this disclosure and particularly with respect to FIG. 1. According to one implementation, UTS 1002 may also include or be communicably coupled with an e-mail server, a web server, a caching server, a streaming data server, and/or other suitable server. In other implementations, the UTS 1002 and related functionality may be provided in a cloud-computing environment.

The UTS 1002 includes an interface 1004, a processor 1005, and a memory 1006 interfacing over a system bus 1003. The interface 1004 is used by the UTS 1002 for communicating with other systems in the EDCS 1000, for example the client 1040. Although illustrated as a single interface 1004 in FIG. 10, two or more interfaces 1004 may be used according to particular needs, desires, or particular implementations of the EDCS 1000. Generally, the interface 1004 comprises logic encoded in software and/or hardware in a suitable combination and operable to communicate with the network 1030. More specifically, the interface 1004 may comprise software supporting one or more communication protocols associated with communications such that the network 1030 or the interface 1004 hardware is operable to communicate physical signals within and outside of the illustrated EDCS 1000.

The processor 1005 is generally used by the UTS 1002 to receive/respond to requests, execute instructions, and/or manipulate data to perform operations specific to the UTS 1002. Specifically, the processor 1005 executes the functionality required to upgrade persistent data using the ZDPE 1007. Although illustrated as a single processor 1005 in FIG. 10, two or more processors 1005 may be used according to particular needs, desires, or particular implementations of the EDCS 1000.

The memory 1006 holds at least objects and/or data required by the UTS 1002 to upgrade persistent data. In some implementations, memory 1006 can act as a cache and/or storage location for persistent data associated with the ORESA 212 and/or upgraded persistent data associated with the NRESA 902. Although illustrated as a single memory 1006 in FIG. 10, two or more memories 1006 may be used according to particular needs, desires, or particular implementations of the EDCS 1000.

In some implementations, the UTS 1002 may execute none, a single instance, and/or a plurality of ZDPEs 1007. In some implementations, the UTS 1002 may comprise a web server, where the ZDPE 1007 represents one or more web-based applications accessed and executed by the client 1040 using the network 1030, directly at the UTS 1002, and/or other components of the EDCS 1000 to perform the programmed tasks or operations of the ZDPE 1007.

The ZDPE 1007 is a service or stand-alone application that migrates persistent data from an older format supported by the ORESA 212 into a newer format usable by the NRESA 902. In some implementations, the ZDPE 1007 is triggered by the overall software upgrade process discussed above. In some implementations, the ZDPE 1007 automatically determines that a migration of persistent data is required, while in others, the migration may be triggered by manual user actions.

The ZDPE 1007 provides, among other things, overall control/management of the persistent data upgrade process, handling of production persistent data requests, confirmation of persistent data upgrade success, and logging of persistent data upgrade results.

The ZDPE 1007 also handles concurrent production transactions running on the ORESA 212 to provide a seamless or near-seamless handling of persistent data transactions and persistent data upgrade. The ZDPE 1007 also ensures any persistent data which has been accessed by a concurrent production transaction during upgrade will be migrated again in order to achieve final data consistency for an upgrade. The ZDPE 1007 also confirms that persistent data is successfully migrated and performs persistent data upgrade process logging functions. Exception handling is also performed by the ZDPE 1007. For example, the ZDPE 1007 can manage upgrade process restarts in the case of upgrade process interruptions and/or process failures.

In some implementations, to upgrade persistent data, the ZDPE 1007 can use a meta-model (described below) to transform persistent data from an old model format to a new model format. During a persistent data upgrade, the ZDPE 1007 updates a shadow database with the old persistent data in the new model format. The ZDPE 1007 provides knowledge and/or logic to update persistent data.

The ZDPE 1007 can also provide application specific upgrade knowledge and/or logic needed for upgrade that is not contained in the meta-model. For example, there may be entries in a dependent database table belonging to a particular persistent data instance. If the dependency is not fully described in the meta model, the ZDPE 1007 provides the logic to determine the identifier for the persistent data instance the entries belong to. In some instances, the data is provided to the ZDPE 1007 by an overall software upgrade process or by a reference for the ZDPE 1007 to access and execute as needed.

The ZDPE 1007 can be any application, program, module, process, or other software that may provide methods and a graphical user interface to evaluate, transform, create, store, delete, and/or other suitable operation required to migrate persistent data from a source format into a target format. In some implementations, a particular ZDPE 1007 can operate in response to and in connection with at least one request received from a client 1040 application, an associated NRESA 902, and/or an ORESA 212. Additionally, a particular ZDPE 1007 may operate in response to and in connection with at least one request received from other ZDPEs 1007, including ZDPEs 1007 associated with another UTS 1002. In some implementations, each ZDPE 1007 can represent a web-based application accessed and executed by remote clients 1040 using the network 1030 (e.g., through the Internet, or using at least one cloud-based service associated with the ZDPE 1007). For example, a portion of a particular ZDPE 1007 may be a web service associated with a ZDPE 1007 that is remotely called, while another portion of the particular ZDPE 1007 may be an interface object or agent bundled for processing at a remote client 1040. Moreover, any or all of a particular ZDPE 1007 may be a child or sub-module of another software module or enterprise application (not illustrated) without departing from the scope of this disclosure. Still further, portions of the particular ZDPE 1007 may be executed or accessed by a user working directly at the UTS 1002, as well as remotely at a corresponding client 1040, or other component of the EDCS 1000.

The PESO 204 is an enterprise server executing the above-mentioned ORESA 212 while the PESN 302 is an enterprise server executing the above-mentioned NRESA 902. In some implementations, the same enterprise server can be used to execute both the ORESA 212 and the NRESA 902.

The PESO 204 and the PESN 302 each include an interface, a processor, and a memory (not illustrated) each similar to the above-mentioned interface 1004, processor 1005, and memory 1006, respectively, of the UTS 1002 and may each be used to perform functions specific to the PESO 204/PESN 302. The interface may be used for communicating with other computing systems in the example distributed computing environment 1000 using the network 1030. The processor specifically executes instructions and manipulates data to perform the operations for the PESO 204/PESN 302, including the functionality required to send/receive requests/responses to/from the UTS 1002, database server 1050, and/or client 1040. The memory stores objects and/or data necessary for the operation of the PESO 204/PESN 302 and to interface with and/or manage the ORESA 212 and/or NRESA 902, respectively.

The client 1040 may be any computing device operable to connect to or communicate with components of the EDCS 1000. In general, the client 1040 comprises an electronic computing device operable to receive, transmit, process, and store any appropriate data associated with the EDCS 1000. More particularly, among other things, the client 1040 can collect content from the client 1040 and upload the collected content to other components of the EDCS 1000. The client typically includes a processor 1044, a client application 1046, a memory 1048, and/or an interface 1049 interfacing over a system bus 1041.

The client application 1046 is any type of application that allows the client 1040 to navigate to/from, request, view, create, edit, delete, administer, and/or manipulate content associated with components of the EDCS 1000. For example, the client application 1046 can present GUI displays and associated data to an end user generated by the upgrade tool server 1002, accept user input, and transmit the user input back to the upgrade tool server 1002 for dissemination to appropriate components of the EDCS 1000. In some implementations, the client application 1046 can use parameters, metadata, and other information received at launch to access a particular set of data from one or more components of the EDCS 1000. Once a particular client application 1046 is launched, a user may interactively process a task, event, or other information associated with components of the EDCS 1000.

In some implementations, the client application 1046 can be a native application. In some implementations, the client application 1046 can be a general access application, for example a browser (or including) a web browser.

In some implementations, the client application 1046 can also be used perform administrative functions related to components of the EDCS 1000. For example, the client application 1046 can be used to configure a persistent data upgrade.

Further, although illustrated as a single client application 1046, the client application 1046 may be implemented as multiple client applications in the client 1040. For example, there may be a native client application and a web-based (e.g., HTML) client application, and the like depending upon the particular needs of the client 1040 or the EDCS 1000.

The interface 1049 is used by the client 1040 for communicating with other computing systems in a distributed computing system environment, including within the EDCS 1000, using network 1030. For example, the client 1040 uses the interface to communicate with the upgrade tool server 1002, production/shadow system 2004, target system 302, and/or a database server 1050. The interface 1049 may be consistent with the above-described interface 1004 of the UTS 1002. The processor 1044 may be consistent with the above-described processor 1005 of the UTS 1002. Specifically, the processor 1044 executes instructions and manipulates data to perform the operations of the client 1040, including the functionality required to send requests to the UTS 1002 and to receive and process responses from the UTS 1002.

The memory 1048 typically stores objects and/or data associated with the purposes of the client 1040 but may also be consistent with the above-described memory 1006 of the UTS 1002 or other memories within the EDCS 1000 and be used to store data similar to that stored in the other memories of the EDCS 1000 for purposes such as backup, caching, and the like.

Further, the illustrated client 1040 includes a GUI 1042 that interfaces with at least a portion of the EDCS 1000 for any suitable purpose. For example, the GUI 1042 (illustrated as associated with client 1040*a*) may be used to view data associated with the client 1040, the UTS 1002, or any other component of the EDCS 1000.

There may be any number of clients 1040 associated with, or external to, the EDCS 1000. For example, while the illustrated EDCS 1000 includes one client 1040 communicably coupled to the UTS 1002 using network 1030, alternative implementations of the EDCS 1000 may include any number of clients 1040 suitable to the purposes of the EDCS 1000. Additionally, there may also be one or more additional clients 1040 external to the illustrated portion of the EDCS 1000 that are capable of interacting with the EDCS 1000 using the network 1030. Further, the term "client" and "user" may be used interchangeably as appropriate without departing from the scope of this disclosure. Moreover, while the client 1040 is described in terms of being used by a single user, this disclosure contemplates that many users may use one computer, or that one user may use multiple computers.

The illustrated client 1040 (example configurations illustrated as 1040a-1040c) is intended to encompass any computing device such as a desktop computer, laptop/notebook computer, wireless data port, smart phone, personal data assistant (PDA), tablet computing device, one or more processors within these devices, or any other suitable processing device. For example, the client 1040 may comprise a computer that includes an input device, such as a keypad, touch screen, or other device that can accept user information, and an output device that conveys information associated with the operation of the UTS 1002 or the client 1040 itself, including digital data, visual and/or audio information, or a GUI 1042, as illustrated specifically with respect to the client 1040a.

The persistency 1052 associated with the database server 1050 is shared by components of the EDCS 1000, for example the UTS 1002, PESO 204, and/or PESN 302. The persistency 1050 can also be of any suitable type, for example a conventional database, in-memory database, or other type of persistency consistent with this disclosure.

Although the UTS 1002, PESO 204, PESN 302, and database server 1050 are illustrated in FIG. 1 as separate servers, in some implementations, each of these servers can also be virtual machines executing on separate physical machines or in varying combinations on one or more physical machines. In some implementations, these servers can also be a mix of physical and virtual machines, for example the UTS 1002, PESO 204, and PESN 302 can be virtual machines executing on a physical database server 1050. In an exemplary implementation, the ZDPE 1007 executing on the UTS 1002 is designed to work "in place" within the productively used database server 1050. In this example, the PESO 204 has stored data in the database and updates the data throughout the procedure. The ZDPE 1007 is then deployed and configured to be aware of the database (e.g., host, port, database user ID/password) and new enterprise server (PESN 302) (e.g., host, port, technical user and password). The deployed ZDPE 1007 then deploys the PESN 302 into the database server 1050 and configures it to operate on the persistency 1052.

FIGS. 11-14 are block diagrams that illustrate rolling back a persistent data upgrade performed in FIGS. 1-5, 6A-6C, and 7-9 according to an implementation.

At a high level, an administrator can use the upgrade instance of the NRESA after the completion of the XPRA execution to test the target version of the software. Programs can be called to display data, the software version and content can be reviewed, and the system can be scanned for executable compilation errors. If the administrator is not satisfied with the target software state, the software can either be repaired, or the admin can decide to roll back the upgrade. If the upgrade is rolled back, the upgrade instance/sub-system is stopped and the tables "V2" of category T-3, T-4, and R are dropped. Afterwards, the tables "V1" of category R, T-3, T-4 are renamed (e.g., from T-~~ to T). Then, ORESA instances are started with a connection to the original DB schema and instances of the bridge sub-system are stopped.

Figure 11:
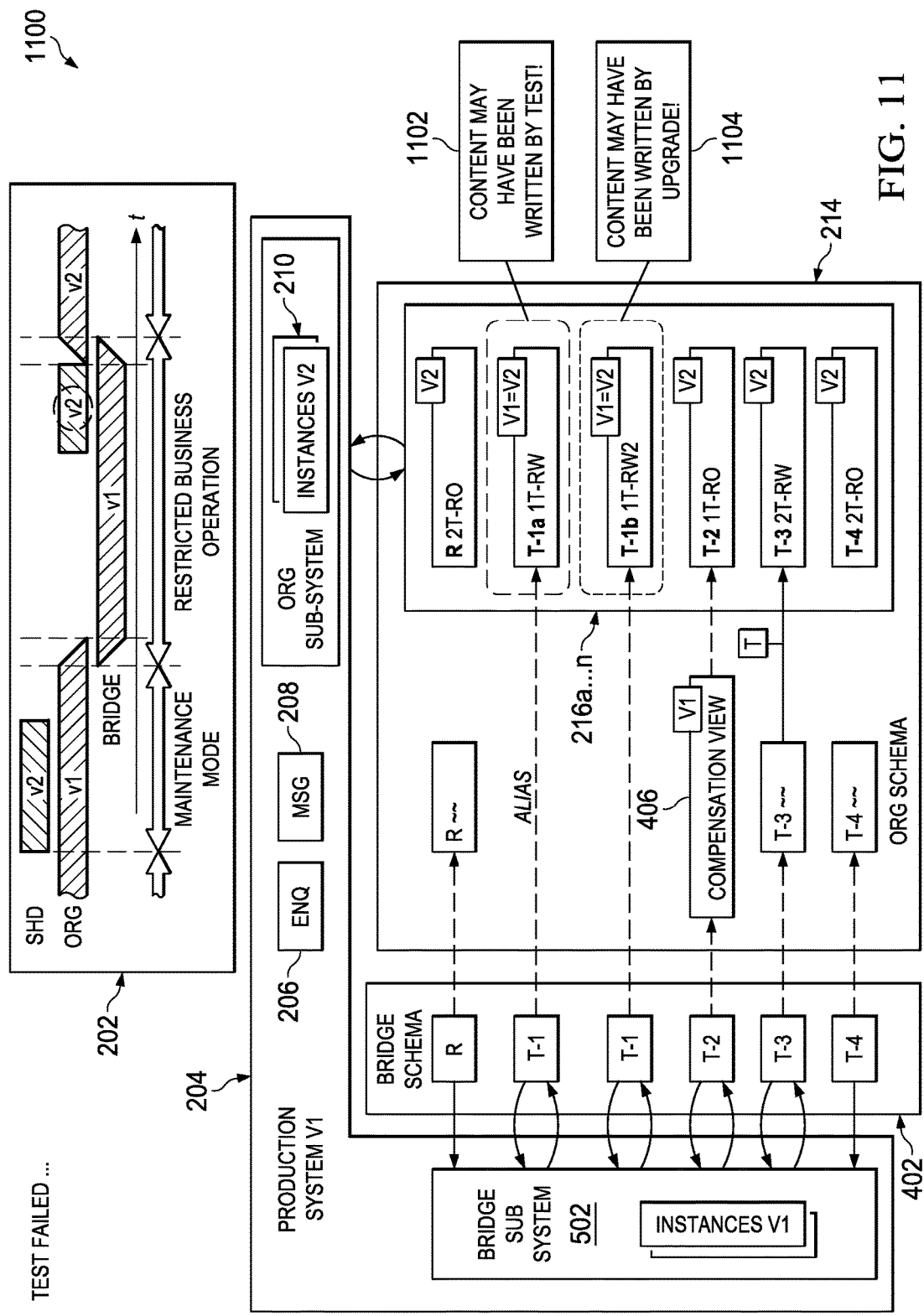
FIG. 11 is a block diagram illustrating errors detected in migrated persistency data according to an implementation.

FIG. 11 is a block diagram 1100 illustrating errors detected in migrated persistency data according to an implementation. Here, errors have been detected in table T-1a from a test process (1102) or a check of content written to table T-1b by the upgrade process (1104). As will be apparent to one of skill in the art, data apart from these two data types and/or in different tables and from various processes (e.g., test/upgrade) can be checked to verify correct data/content following a persistent data migration.

Figure 12:
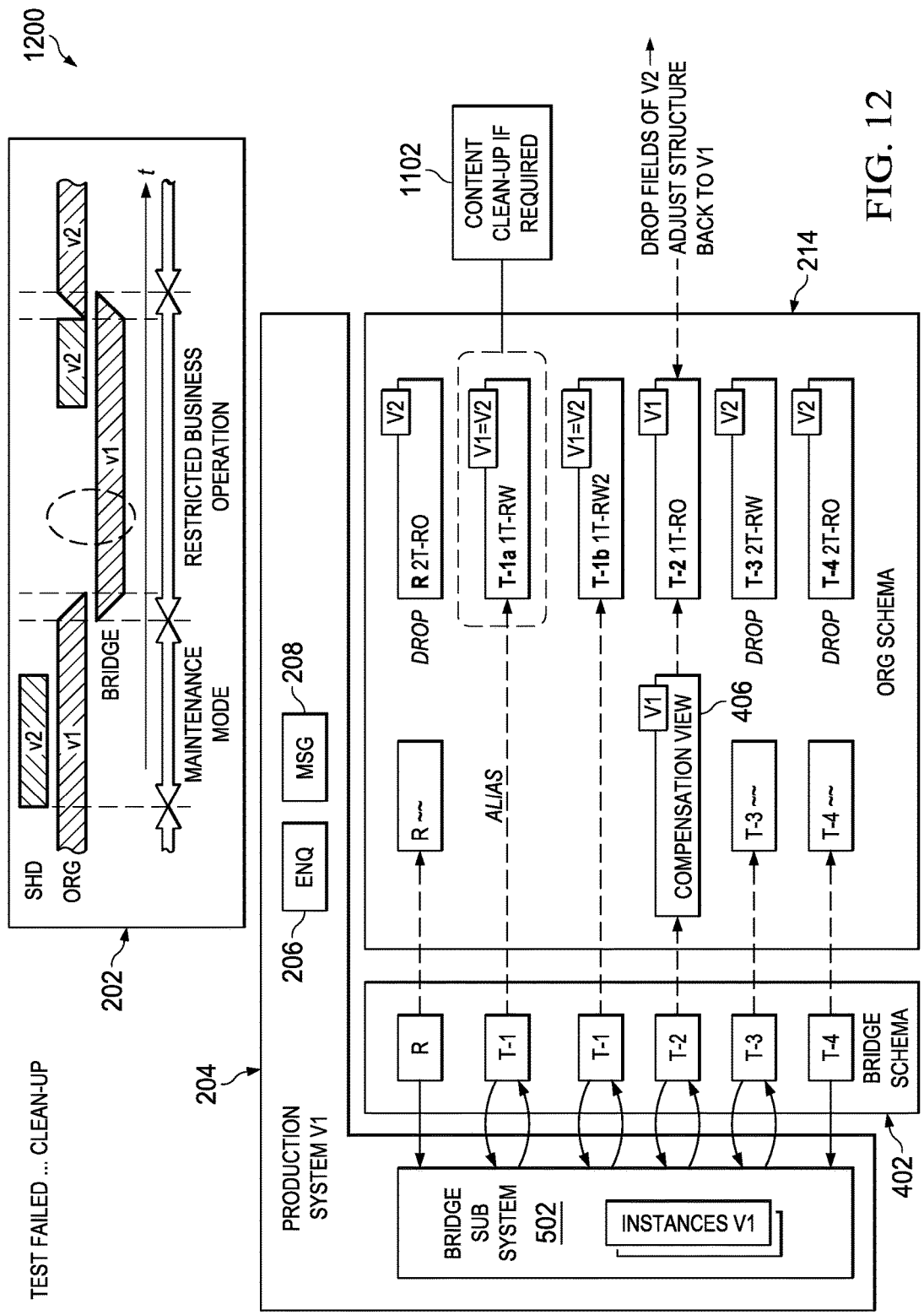
FIG. 12 is a block diagram illustrating clean-up steps following a failure of a persistent data migration according to an implementation.

FIG. 12 is a block diagram 1200 illustrating clean-up steps following a failure of a persistent data migration according to an implementation. Here, data from test process 1102 can be cleaned up if necessary to do for a roll-back. Tables "V2" of category T-3, T-4 and R are dropped to prepare to adjust the structure back to that of the old version (ORESA). Database table T-2 fields for the NRESA are also dropped to revert the database table back to ORESA format.

Figure 13:
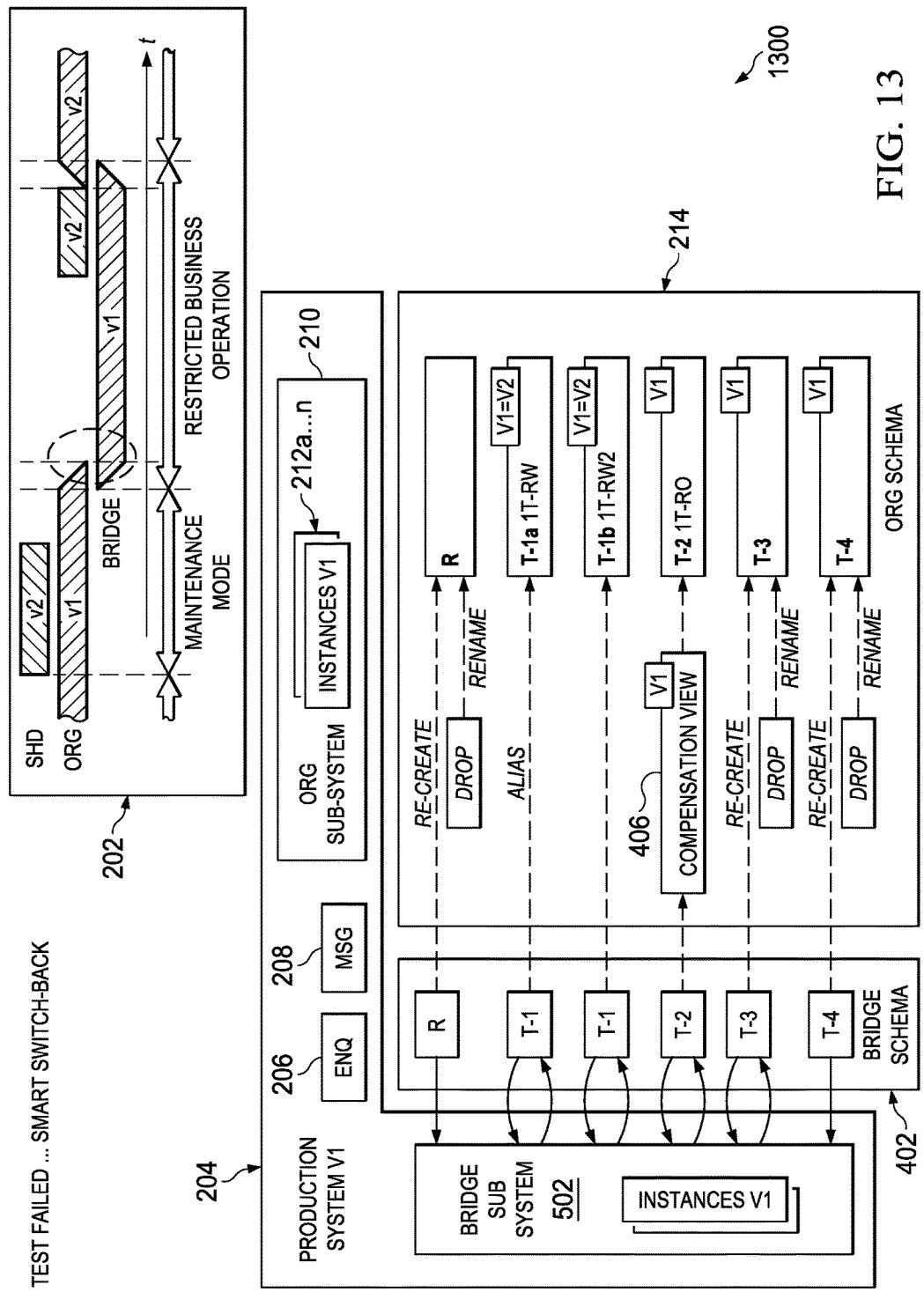
FIG. 13 is a block diagram illustrating recreation of old version database tables in response to a roll-back operation according to an implementation.

FIG. 13 is a block diagram 1300 illustrating recreation of old version database tables in response to a roll-back operation according to an implementation. Here database tables R, T-3, and T-4 are renamed from "R~~," "T-3," and "T-4~~," respectively.

Figure 14:
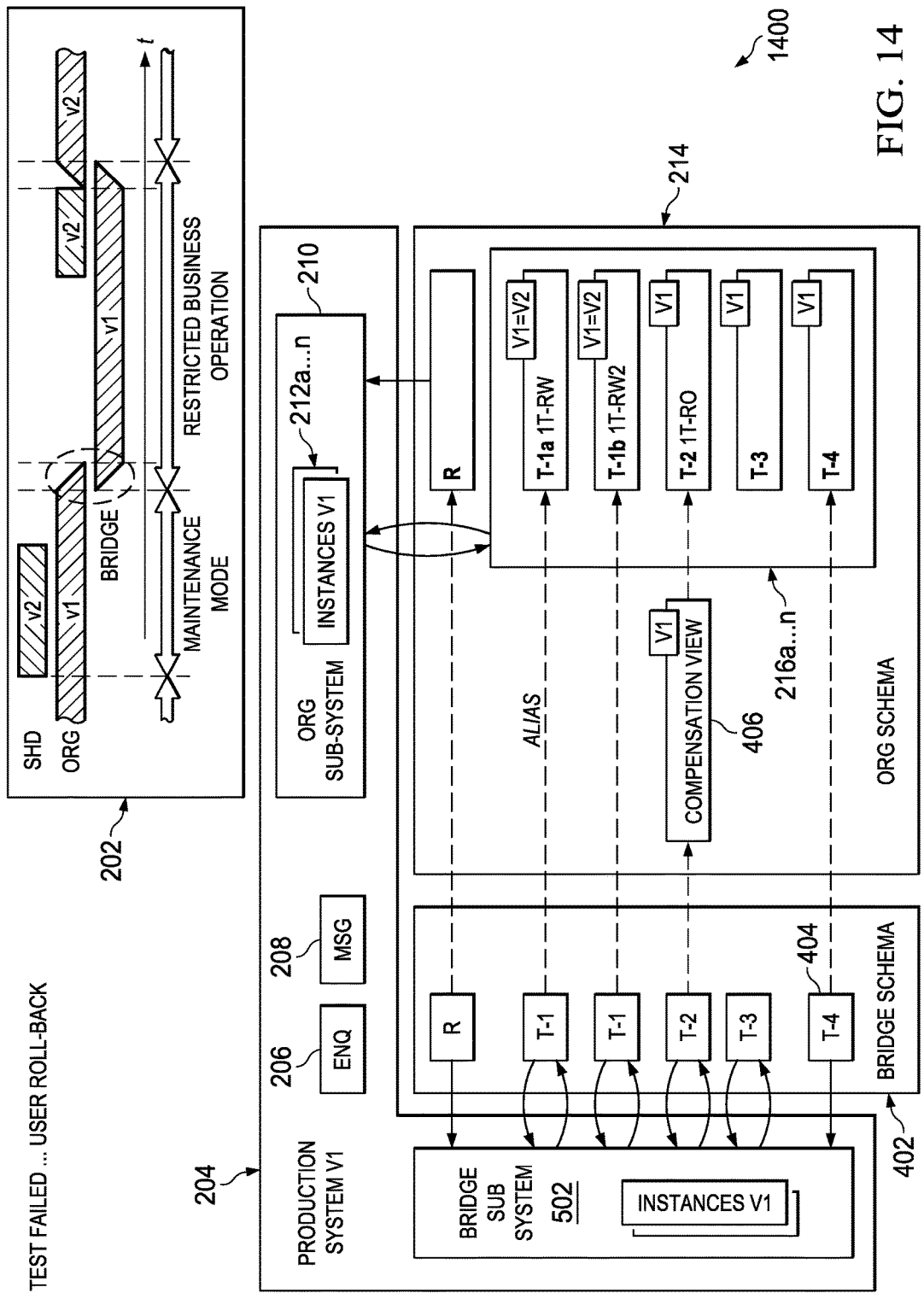
FIG. 14 is a block diagram illustrating a re-configured system following a user roll-back due to errors detected in migrated persistency data according to an implementation.

FIG. 14 is a block diagram illustrating a re-configured system following a user roll-back due to errors detected in migrated persistency data according to an implementation. Here ORESA instances 210/212a . . . *n* are started with a connect to the original DB schema 214 and ORESA instances associated with the bridge sub-system 502 are stopped. Depending on whether the persistent data migration will be attempted again, the bridge sub-system 502, bridge schema/aliases 402/404, and compensation views 406 can also be dropped.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a graphics processing unit (GPU), a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or GUI, may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method for performing a persistent data upgrade, comprising:
    instantiating, by a computer, a shadow system for a new version software application and a shadow system database schema in a database associated with persistent data and shared with a production system executing a first version software application, the shadow system database schema acting as a database connector and containing aliases pointing to original database tables instantiated in a production database schema associated with the production system, the new version software application requiring the persistent data upgrade;
    instantiating a bridge database schema in the database, wherein the bridge database schema contains aliases pointing to each database table within the production database schema;
    preparing a bridge sub-system to execute as the first version software application, the bridge sub-system being connected to the aliases contained within the bridge database schema;
    replicating database tables within the production database schema, wherein the replicated database tables are used by the bridge sub-system and the original database tables are adjusted for structure and content consistent with the new version software application;
    deploying an upgrade sub-system and tools to complete adjustment of structure and content of the original database tables, thereby creating new version database tables, for the new version software application; and
    instantiating an instance of the new version software application and connecting the new version software application to the new version database tables.

2. The method of claim 1, wherein an alias in the shadow system database schema points to a table instantiated in the production database schema containing at least the new version software application.

3. The method of claim 1, wherein each database table within the production database schema is categorized according to the data associated with the database table.

4. The method of claim 3, wherein only particular categorized database tables are replicated for use by the bridge sub-system.

5. The method of claim 1, further comprising stopping the first version software application following rolling all end users from the first version software application to the bridge sub-system.

6. The method of claim 1, wherein a compensation view is generated for the original database tables within the production database schema and is associated with one of the aliases contained within the bridge database schema, the compensation view being generated for one of the original database tables normally accessed using a view.

7. The method of claim 1, further comprising shutting down the bridge sub-system, deleting the bridge database schema and associated aliases, and deleting the replicated database tables used by the bridge sub-system.

8. The method of claim 1, further comprising:
generating a new alias with a new alias name to point to one of the original database tables;
dropping the new alias and renaming the one of the original database tables to the new alias name; and
repeating an access attempt to the new alias name after a dynamic or pre-determined time interval if the access attempt is made to the new alias or the one of the original database tables prior to completion of the dropping step and a database access error is generated.

9. A non-transitory, computer-readable medium storing computer-readable instructions executable by a computer and operable to:
instantiate a shadow system for a new version software application and a shadow system database schema in a database associated with persistent data and shared with a production system executing a first version software application, the shadow system database schema acting as a database connector and containing aliases pointing to original database tables instantiated in a production database schema associated with the production system, the new version software application requiring the persistent data upgrade;
instantiate a bridge database schema in the database, wherein the bridge database schema contains aliases pointing to each database table within the production database schema;
prepare a bridge sub-system to execute as the first version software application, the bridge sub-system being connected to the aliases contained within the bridge database schema;
replicate database tables within the production database schema, wherein the replicated database tables are used by the bridge sub-system and the original database tables are adjusted for structure and content consistent with the new version software application;
deploy an upgrade sub-system and tools to complete adjustment of structure and content of the original database tables, thereby creating new version database tables, for the new version software application; and
instantiate an instance of the new version software application and connecting the new version software application to the new version database tables.

10. The medium of claim 9, wherein an alias in the shadow system database schema points to a table instantiated in the production database schema containing at least the new version software application.

11. The medium of claim 9, wherein each database table within the production database schema is categorized according to the data associated with the database table.

12. The medium of claim 11, wherein only particular categorized database tables are replicated for use by the bridge sub-system.

13. The medium of claim 9, further storing instructions to stop the first version software application following rolling all end users from the first version software application to the bridge sub-system.

14. The medium of claim 9, wherein a compensation view is generated for the original database tables within the production database schema and is associated with one of the aliases contained within the bridge database schema, the compensation view being generated for one of the original database tables normally accessed using a view.

15. The medium of claim 9, further storing instructions to shut down the bridge sub-system, deleting the bridge database schema and associated aliases, and deleting the replicated database tables used by the bridge sub-system.

16. The medium of claim 9, further storing instructions to:
generate a new alias with a new alias name to point to one of the original database tables;
drop the new alias and renaming the one of the original database tables to the new alias name; and
repeat an access attempt to the new alias name after a dynamic or pre-determined time interval if the access attempt is made to the new alias or the one of the original database tables prior to completion of the dropping step and a database access error is generated.

17. A system, comprising:
a memory configured to hold persistent data;
at least one computer interoperably coupled with the memory and configured to:
instantiate a shadow system for a new version software application and a shadow system database schema in a database associated with persistent data and shared with a production system executing a first version software application, the shadow system database schema acting as a database connector and containing aliases pointing to original database tables instantiated in a production database schema associated with the production system, the new version software application requiring the persistent data upgrade;
instantiate a bridge database schema in the database, wherein the bridge database schema contains aliases pointing to each database table within the production database schema;
prepare a bridge sub-system to execute as the first version software application, the bridge sub-system being connected to the aliases contained within the bridge database schema;
replicate database tables within the production database schema, wherein the replicated database tables are used by the bridge sub-system and the original database tables are adjusted for structure and content consistent with the new version software application;
deploy an upgrade sub-system and tools to complete adjustment of structure and content of the original database tables, thereby creating new version database tables, for the new version software application; and
instantiate an instance of the new version software application and connecting the new version software application to the new version database tables.

18. The system of claim 17, wherein each database table within the production database schema is categorized according to the data associated with the database table, and wherein only particular categorized database tables are replicated for use by the bridge sub-system.

19. The system of claim 17, further configured to:
stop the first version software application following rolling all end users from the first version software application to the bridge sub-system; and shut down the bridge sub-system, deleting the bridge database schema and associated aliases, and deleting the replicated database tables used by the bridge sub-system.

20. The system of claim 17, further configured to:

generate a new alias with a new alias name to point to one of the original database tables;

drop the new alias and renaming the one of the original database tables to the new alias name; and repeat an access attempt to the new alias name after a dynamic or pre-determined time interval if the access attempt is made to the new alias or the one of the original database tables prior to completion of the dropping step and a database access error is generated.

* * * * *